US006395846B1

(12) United States Patent
Sato et al.

(10) Patent No.: US 6,395,846 B1
(45) Date of Patent: May 28, 2002

(54) CATALYSTS FOR OLEFIN POLYMER PRODUCTION

(75) Inventors: Haruhito Sato, Ichihara; Masahiko Kuramoto, Chiba, both of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/509,569

(22) PCT Filed: Aug. 19, 1999

(86) PCT No.: PCT/JP99/04452
§ 371 (c)(1),
(2), (4) Date: Apr. 18, 2000

(87) PCT Pub. No.: WO00/11044
PCT Pub. Date: Mar. 2, 2000

(30) Foreign Application Priority Data

Aug. 20, 1998 (JP) .......................... 10-233818
Dec. 17, 1998 (JP) .......................... 10-359457
Dec. 22, 1998 (JP) .......................... 10-364187

(51) Int. Cl.[7] .................. C08F 4/02; C08F 4/44; C08F 4/62; C08F 4/70
(52) U.S. Cl. .................. 526/92; 526/91; 526/93; 526/126; 526/128; 526/141; 526/142; 526/160; 526/161; 502/62; 502/63; 502/74; 502/80; 502/111; 502/117; 502/118; 502/124; 502/125; 502/155; 502/158

(58) Field of Search .................. 502/111, 117, 502/118, 62, 63, 74, 80, 124, 125, 155, 158; 526/92, 142, 160, 91, 93, 126, 128, 141, 161

(56) References Cited

FOREIGN PATENT DOCUMENTS

| EP | 546503 A1 | * | 6/1993 |
| EP | 856524 A1 | * | 8/1998 |
| JP | 11106418 A | * | 4/1999 |

* cited by examiner

Primary Examiner—David W. Wu
Assistant Examiner—R. Rabago
(74) Attorney, Agent, or Firm—Oblon, Spivak, McClelland, Maier & Neustadt, P.C.

(57) ABSTRACT

The invention relates to high-activity catalysts for olefin polymerization, to efficient methods for producing them, and to efficient methods of using the catalysts for producing high-quality polyolefins. The olefin polymerization with the catalysts does not require a large amount of an organic aluminium compound, and the residual metal in the polyolefins produced is much reduced. The catalysts are characterized by containing a product as prepared by contacting any of clay, a clay mineral and an ion-exchanging layered compound, an organic silane compound, and water with each other, or by containing a silane compound-processed clay.

29 Claims, 5 Drawing Sheets

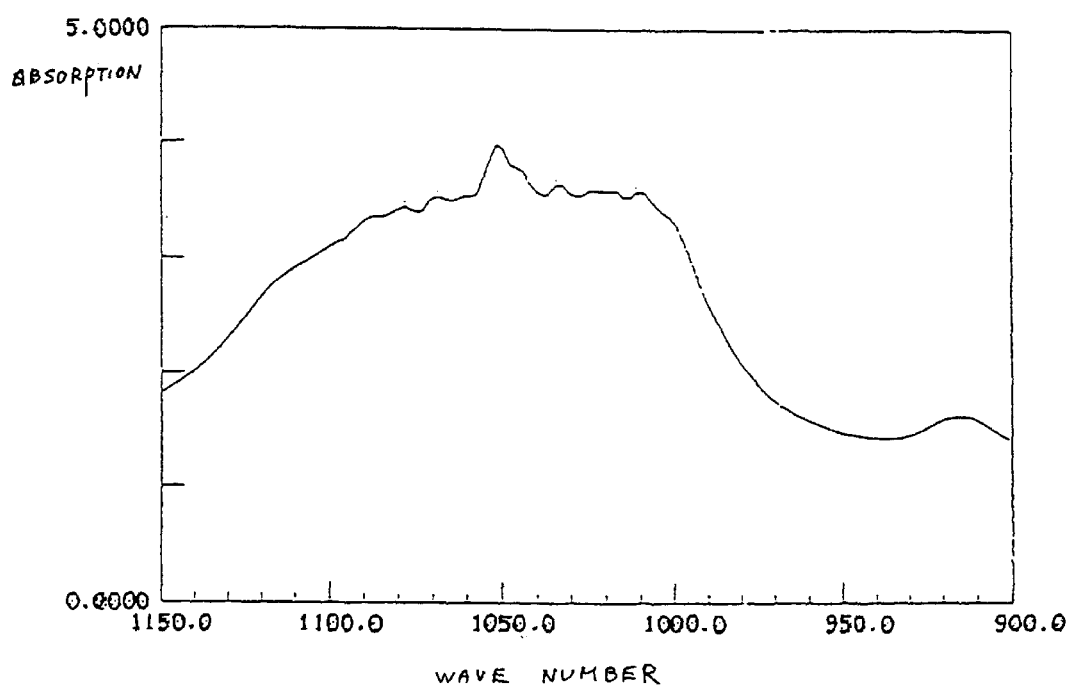

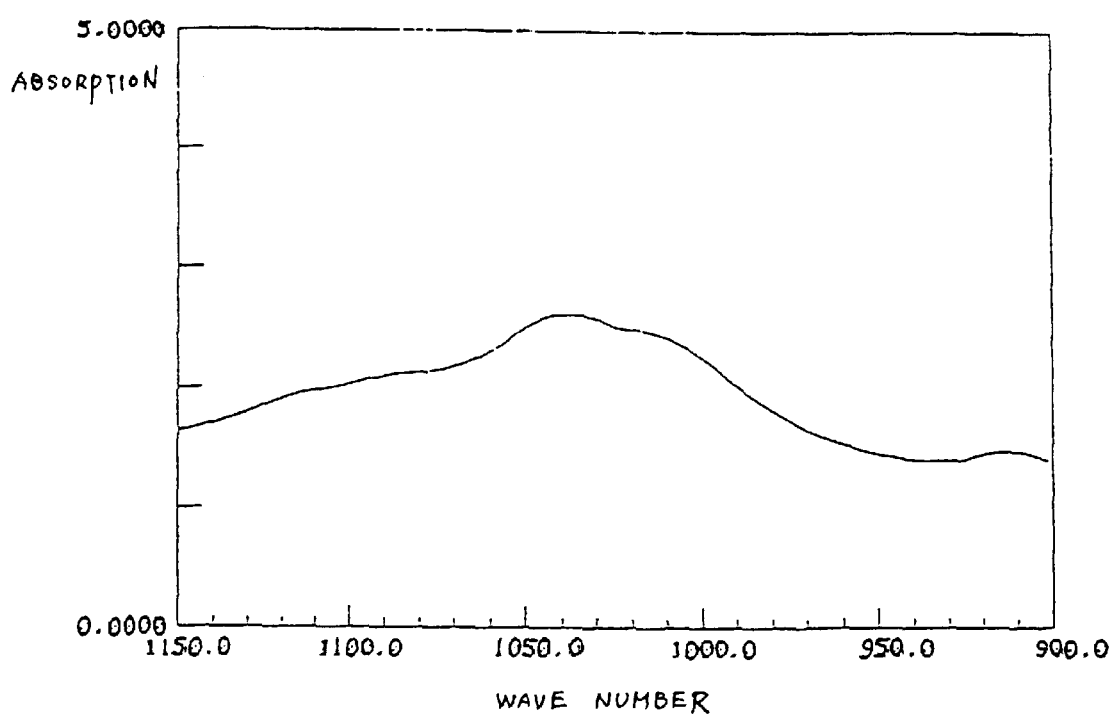
[ Fig. 2 ]

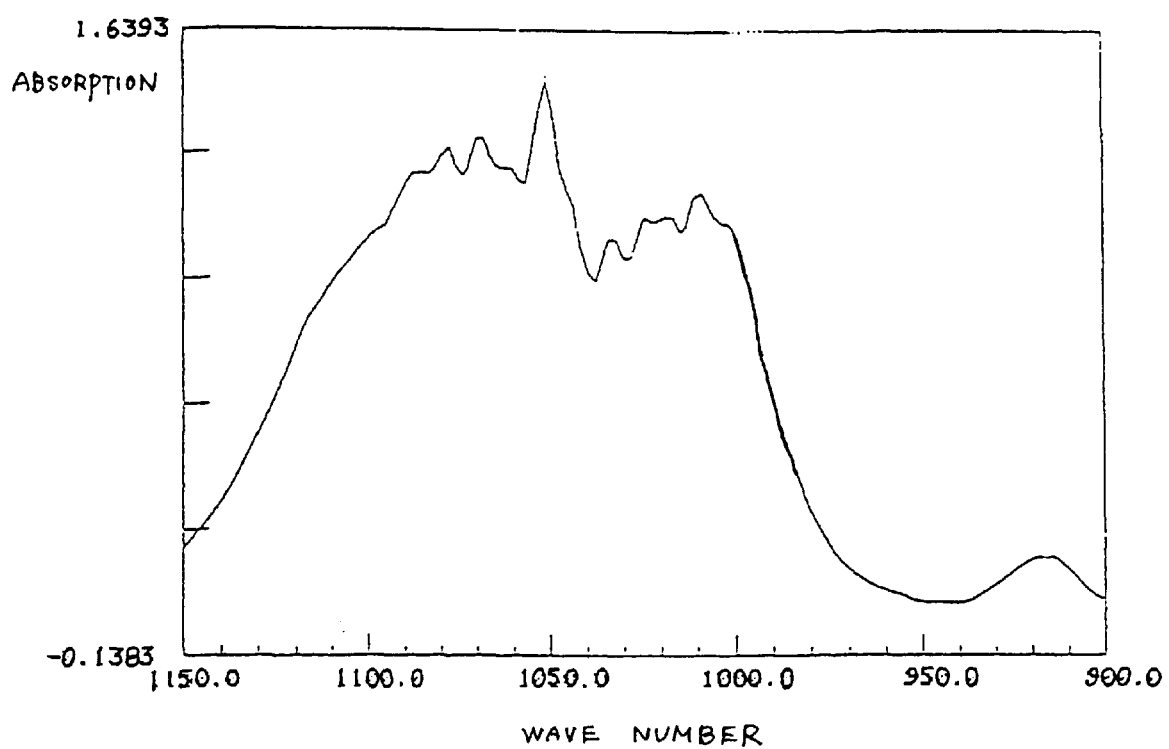

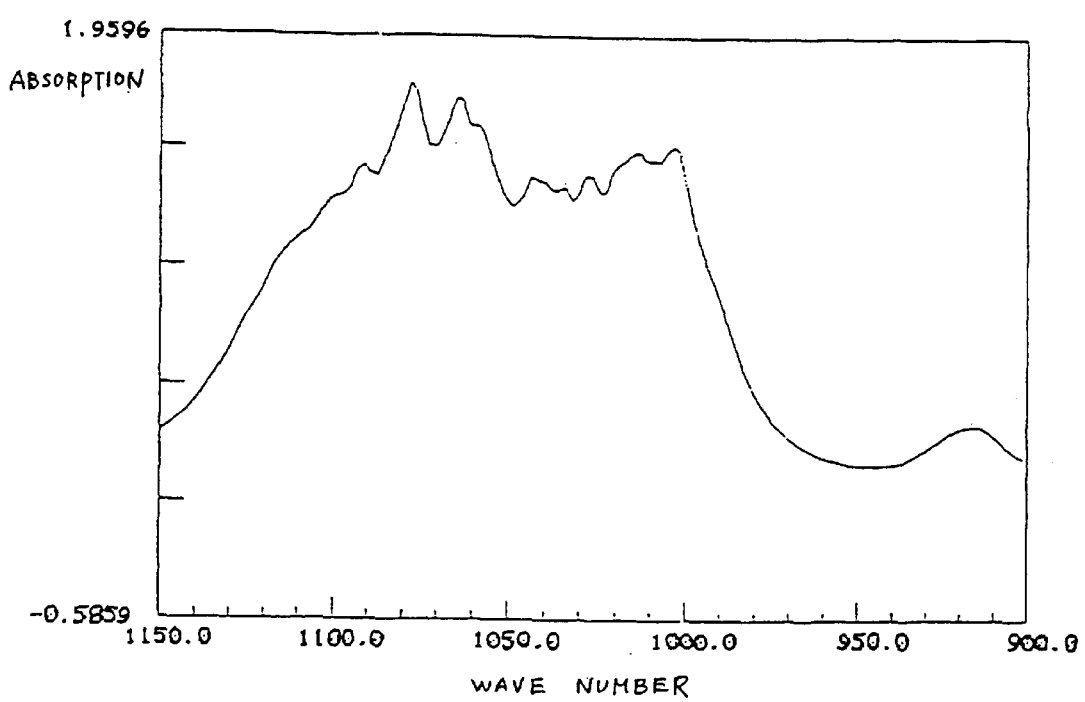
[ Fig. 4 ]

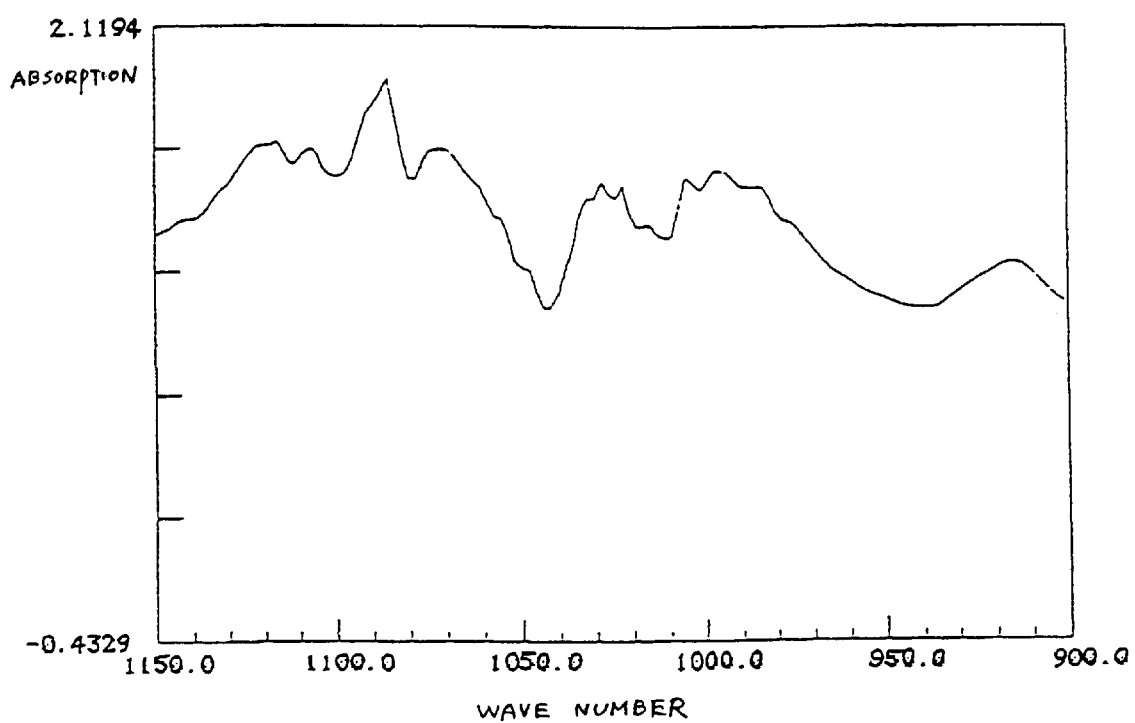
[ Fig. 5 ]

CATALYSTS FOR OLEFIN POLYMER PRODUCTION

BACKGROUND OF THE INVENTION

1. Field of the Invention

The present invention relates to catalysts for olefin polymerization, methods for producing them, and methods for producing olefin polymers. More precisely, the invention relates to high-activity catalysts for olefin polymerization, to efficient methods for producing them, and to methods of using the olefin polymerization catalysts for efficiently producing high-quality olefin polymers.

2. Background Art

Recently, a method has been proposed of using a catalyst comprising a metallocene compound and an aluminoxane for polymerizing olefins in the presence of the catalyst to produce olefin polymers (Japanese Patent Laid-Open Nos. 19309/1983, 167307/1990). It is known that the polymerizing method of using such a catalyst is better than a method of using a conventional Ziegler-Natta catalyst that comprises a titanium or vanadium compound and an organic aluminium compound since the polymerization activity per the transition metal in the former is extremely high and since the former produces polymers having a narrow molecular weight distribution.

Another method has been proposed for polymerizing olefins in the presence of a catalyst that comprises catalytic components of a transition metal compound and an aluminoxane or organic aluminium compound as carried on an inorganic oxide such as silica, alumina or the like (Japanese Patent Laid-Open Nos. 108610/1986, 101303/1989).

However, in order that the methods noted above could have a satisfactory degree of polymerization activity, a large amount of an aluminoxane must be used therein. Therefore, in those methods, the activity per aluminium used is low, and the methods are uneconomical. In addition, since a large amount of aluminium remains in the polymers formed, the methods are further problematic in that the catalyst residue must be removed from the polymers formed therein.

Still another method has been proposed of using clay minerals as catalytic components (Japanese Patent Laid-Open Nos. 25214/1993, 301917/1993, 33814/1995). In this method, however, it is said that the clay minerals to be used must be pre-treated with organic aluminium compounds, especially with methylaluminoxane or trimethylaluminium which is extremely expensive and dangerous. In addition, the method is problematic in that the catalyst activity per aluminium therein is not satisfactory and the amount of the catalyst residue that may remain in the products is large.

In particular, the additional problem with the method of using such clay minerals is that aqueous suspensions of the clay minerals must be repeatedly pre-treated with magnesium chloride or the like and must be thereafter further treated with hydrochloric acid and then washed, and the treatment requires a lot of time.

The present invention has been made in consideration of the problems noted above, and its object is to provide catalysts for olefin polymerization capable of being prepared within a short period of time and to provide methods of using the catalysts for efficiently and inexpensively producing olefin polymers. Specifically, the catalysts do not require a large amount of methylaluminoxane or trimethylaluminium which has poor storage stability and is dangerous and which is therefore not easy to handle. In addition, in the methods of using the catalysts for olefin polymerization, since the amount of the organic aluminium compound to be used in the total polymerization system can be greatly reduced, the metal component that may remain in the polymers produced is much reduced. Therefore, the polymers produced in the methods do not require post-treatment. In particular, the catalysts are especially favorable to producing styrenic polymers having a stereospecifically-controlled syndiotactic structure.

SUMMARY OF THE INVENTION

The present invention encompasses three aspects, which are mentioned in detail hereinunder.

We, the present inventors have found that the object of the invention noted above can be attained by using a polymerization catalyst that comprises catalytic components having been specifically treated, and, on the basis of this finding, we have completed the first aspect of the invention.

Specifically, the first aspect of the invention is to provide a catalyst for olefin polymer production, a method for producing it, and a method of using it for producing olefin polymers, which are as follows:

1. A catalyst for olefin polymer production, which is obtained by contacting a product as prepared by contacting (A) clay, a clay mineral or an ion-exchanging layered compound, (B) an organic silane compound and (C) water with each other, with (D) a transition metal complex containing a transition metal of Groups 4 to 6 or Groups 8 to 10 of the Periodic Table.

2. A catalyst for olefin polymer production, which is obtained by contacting a product as prepared by contacting (A) clay, a clay mineral or an ion-exchanging layered compound, (B) an organic silane compound and (C) water with each other, with (D) a transition metal complex containing a transition metal of Groups 4 to 6 or Groups 8 to 10 of the Periodic Table and (E) an alkylating agent.

3. The catalyst for olefin polymer production of above 1 or 2, wherein the component (A), clay, a clay mineral or an ion-exchanging layered compound is selected from phyllo-silicic acid compounds.

4. The catalyst for olefin polymer production of any one of above 1 to 3, wherein the component (B), an organic silane compound has at least one alkyl group directly bonded to the silicon atom of the compound.

5. The catalyst for olefin polymer production of any one of above 1 to 4, wherein the amount of the component (C), water is at least 1% by weight relative to the dry weight of the component (A).

6. The catalyst for olefin polymer production of any one of above 1 to 5, wherein the component (D), a transition metal complex containing a transition metal of Groups 4 to 6 or Groups 8 to 10 of the Periodic Table has a ligand having a carbon-carbon unsaturated bonding group or a carbon-nitrogen unsaturated bonding group.

7. The catalyst for olefin polymer production of any one of above 1 to 6, wherein the component (D), a transition metal complex containing a transition metal of Groups 4 to 6 or Groups 8 to 10 of the Periodic Table is represented by any of the following general formulae (I-1) to (I-4):

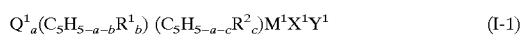

$(C_5H_{5-e}R^4{}_e)M^1X^1Y^1W^1$ (I-3)

$L^1L^2M^2X^1Y^1$ (I-4)

where $Q^1$ represents a bonding group that crosslinks the two conjugated five-membered cyclic ligands $(C_5H_{5-a-b}R^1{}_b)$ and $(C_5H_{5-a-c}R^2{}_c)$;

$Q^2$ represents a bonding group that crosslinks the conjugated five-membered cyclic ligand $(C_5H_{5-a-d}R^3{}_d)$ and the group $Z^1$;

$R^1$, $R^2$, $R^3$ and $R^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure;

a represents 0, 1 or 2;

b, c and d each represent an integer of from 0 to 5 when a=0, or an integer of from 0 to 4 when a=1, or an integer of from 0 to 3 when a=2;

e represents an integer of from 0 to 5;

$M^1$ represents a transition metal of Groups 4 to 6 of the Periodic Table;

$M^2$ represents a transition metal of Groups 8 to 10 of the Periodic Table;

$L^1$ and $L^2$ each represent a coordination-bonding ligand;

$X^1$, $Y^1$, $Z^1$ and $W^1$ each represent a covalent-bonding or ionic-bonding ligand; and $L^1$, $L^2$, $X^1$, $Y^1$ and $W^1$ may be bonded to each other to form a cyclic structure.

8. The catalyst for olefin polymer production of any one of above 2 to 7, wherein the component (E), an alkylating agent is an organic aluminium compound.

9. A method for producing a catalyst for olefin polymer production, which comprises contacting (A) clay, a claymineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table.

10. A method for producing a catalyst for olefin polymer production, which comprises contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table and (E) an alkylating agent.

11. The method for producing a catalyst for olefin polymerization of above 9, wherein the step of contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table is effected in an anhydrous aprotic solvent.

12. The method for producing a catalyst for olefin polymerization of above 10, wherein the step of contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table and (E) an alkylating agent is effected in an anhydrous aprotic solvent.

13. A method for producing olefin polymers, for which is used the catalyst for olefin polymer production of any one of above 1 to 8.

We, the inventors have further found that the object of the invention can be attained by a method of producing a catalyst for olefin polymerization from a transition metal compound and a silane compound-processed clay, which comprises contacting a transition metal compound with a silane compound-processed clay as prepared by contacting an aqueous dispersion of water-swellable clay with a silane compound, and, on the basis of this finding, we have completed the second aspect of the invention.

Specifically, the second aspect of the invention is to provide the following:

1. A method of producing a catalyst for olefin polymerization from a transition metal compound and a silane compound-processed clay, which comprises contacting a transition metal compound with a silane compound-processed clay as prepared by contacting a clay dispersion of water-swellable clay in water with a silane compound.

2. The method of producing a catalyst for olefin polymerization of above 1, wherein the water-swellable clay is a phyllosilicate.

3. The method of producing a catalyst for olefin polymerization of above 1, wherein the water-swellable clay is of the smectite family or the mica family.

4. The method of producing a catalyst for olefin polymerization of above 1, wherein the water-swellable clay is an alkali metal or alkaline earth metal salt of montmorillonite.

5. The method of producing a catalyst for olefin polymerization of any one of above 1 to 4, wherein a clay dispersion as prepared by dispersing water-swellable clay in water of at least 40 times by weight the clay is contacted with a silane compound.

6. The method of producing a catalyst for olefin polymerization of any one of above 1 to 5, wherein the silane compound is represented by a general formula (II-1):

$(R)_n\text{—Si—}X_{(4-n)}$ (II-1)

where R represents a substituent of which the atom in the site directly bonding to the silicon atom is a carbon, silicon or hydrogen atom; X represents a substituent of which the atom in the site directly bonding to the silicon atom is a halogen, oxygen or nitrogen atom; plural R's and X's, if any, may be the same or different ones, respectively; and n represents 0 or an integer of from 1 to 4.

7. The method of producing a catalyst for olefin polymerization of any one of above 1 to 5, wherein the silane compound is represented by a general formula (II-2):

$(R)_m\text{—Si—}X_{(4-m)}$ (II-2)

where R represents a substituent of which the atom in the site directly bonding to the silicon atom is a carbon, silicon or hydrogen atom; X represents a substituent of which the atom in the site directly bonding to the silicon atom is a halogen, oxygen or nitrogen atom; plural R's and X's, if any, may be the same or different ones, respectively; and m represents an integer of from 1 to 3.

8. The method of producing a catalyst for olefin polymerization of any one of above 1 to 7, wherein the transition metal compound is a complex of a transition metal of Groups 4 to 6 of the Periodic Table having a conjugated five-membered ring as the ligand, or a complex of a transition metal of Groups 8 to 10 of the Periodic Table having an organic ligand as bonded to the transition metal via a nitrogen or phosphorus atom therebetween.

9. The method of producing a catalyst for olefin polymerization of any one of above 1 to 8, wherein the components are further contacted with an organic metal compound with a metal of Groups 1, 2, 13 and 14 of the Periodic Table.

10. A catalyst for olefin polymerization, which is produced according to the method of any one of above 1 to 9.

11. A method for producing olefin polymers, wherein olefins are polymerized in the presence of the catalyst for olefin polymerization of above 10.

We, the inventors have still further found that the object of the invention can be attained by a catalyst for olefin polymerization, which comprises a transition metal compound and a silane compound-processed clay that gives absorption peaks in a specific wavelength range in infrared absorption spectrometry, and, on the basis of this finding, we have completed the third aspect of the invention.

Specifically, the third aspect of the invention is to provide the following:

1. A catalyst for olefin polymerization, which comprises a transition metal compound and a silane compound-processed clay that gives absorption peaks in a range falling between 1090 and 1050 cm$^{-1}$ and/or in a range falling between 1015 and 995 cm$^{-1}$ in infrared absorption spectrometry.

2. The catalyst for olefin polymerization of above 1, wherein the silane compound-processed clay is prepared by processing a phyllosilicate with a silane compound.

3. The catalyst for olefin polymerization of above 1 or 2, wherein the silane compound-processed clay is prepared by processing a mineral of the smectite family or a compound having a smectite structure with a silane compound.

4. The catalyst for olefin polymerization of any one of above 1 to 3, wherein the silane compound-processed clay is prepared by processing montmorillonite with a silane compound.

5. The catalyst for olefin polymerization of any one of above 1 to 4, wherein the transition metal compound is a complex of a transition metal of Groups 4 to 6 of the Periodic Table having a conjugated five-membered ring as the ligand, or a complex of a transition metal of Groups 8 to 10 of the Periodic Table having an organic ligand as bonded to the transition metal via a nitrogen or phosphorus atom therebetween.

6. The catalyst for olefin polymerization of any one of above 1 to 5, which further contains an organic metal compound with a metal of Groups 1, 2, 13 and 14 of the Periodic Table.

7. A method for producing a catalyst for olefin polymerization, which comprises contacting a silane compound-processed clay with a transition metal compound and in which said silane compound-processed clay is prepared by contacting a silane compound of a general formula (III-1):

$$(R)_n\text{—Si—}X_{(4-n)} \quad (\text{III-1})$$

where R represents a substituent of which the atom in the site directly bonding to the silicon atom is a carbon, silicon or hydrogen atom; X represents a substituent of which the atom in the site directly bonding to the silicon atom is a halogen, oxygen or nitrogen atom; plural R's and X's, if any, may be the same or different ones, respectively; and n represents an integer of 2 or 3, with clay, and gives absorption peaks in a range between falling 1090 and 1050 cm$^{-1}$ and/or in a range falling between 1015 and 995 cm$^{-1}$ in infrared absorption spectrometry.

8. A method for producing olefin polymers, wherein olefins are polymerized in the presence of the catalyst for olefin polymerization of any one of above 1 to 6.

9. A method for producing olefin polymers, wherein olefins are polymerized in the presence of the catalyst for olefin polymerization as obtained according to the method of above 7.

BRIEF DESCRIPTION OF THE DRAWINGS

FIG. 1 is the infrared absorption spectrum (A) of diethyldichlorosilane-processed clay as prepared in Example III-1.

FIG. 2 is the infrared absorption spectrum (B) of Na-montmorillonite used as the starting material in Example III-1.

FIG. 3 is the differences spectrum (C) between the infrared absorption spectrum (A) and the infrared absorption spectrum (B).

FIG. 4 is the difference spectrum (D) between the infrared absorption spectrum of triethylchlorosilane-processed clay as prepared in Example III-2 and the infrared absorption spectrum of the starting clay.

FIG. 5 is the difference spectrum (E) between the infrared absorption spectrum of trimethylchlorosilane-processed clay as prepared in Example III-3 and the infrared absorption spectrum of the starting clay.

DETAILED DESCRIPTION OF THE INVENTION

Preferred embodiments of the invention are described below.

FIRST ASPECT OF THE INVENTION

1. Catalyst for Olefin Polymer Production:

The catalyst for olefin polymer production of the first aspect of the invention (this will be simply referred to as "the invention" in this section) is obtained by contacting a product as prepared by contacting (A) clay, a clay mineral or an ion-exchanging layered compound, (B) an organic silane compound and (C) water with each other, with (D) a transition metal complex containing a transition metal of Groups 4 to 6 or Groups 8 to 10 of the Periodic Table and optionally with (E) an alkylating agent.

Component (A):

(1) Clay and Clay Minerals:

Clay or clay minerals may be used as the component (A). Clay is an aggregate of fine hydrous silicate minerals. It is plastic when kneaded with a suitable amount of water, and is rigid when dried. When baked at high temperatures, it is sintered. Clay minerals are hydrous silicates which are the essential components constituting clay.

These are not limited to only natural ones, but synthetic products of those substances are employable herein.

(2) Ion-exchanging Layered Compounds:

As the component (A), also usable are ion-exchanging layered compounds, which are characterized by the crystal structure of such that a plurality of crystal planes formed through ionic bonding or the like are laminated in parallel layers via weak bonding force between the adjacent layers, and in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of the smectite family; illite and sericite of the mica family; and mixed layer minerals of smectites and micas, or those of micas and vermiculites.

As synthetic products, known are fluoro-tetrasilicon mica, laponite, smectone, etc.

Also mentioned are ionic crystalline compounds having a layered crystal structure, such as $\alpha$-Zr(HPO$_4$)$_2$, $\gamma$-Zr(HPO$_4$)$_2$, $\alpha$-Ti(HPO$_4$)$_2$, $\gamma$-Ti(HPO$_4$)$_2$, etc. These are not clay minerals.

Examples of clay and clay minerals which do not belong to ion-exchanging layered compounds and which are usable as the component (A) include clay having a low montmorillonite content and referred to as bentonite; kibushi clay comprising montmorillonite and many other components; gairome clay; sepiolite and palygorskite having a fibrous morphology; and amorphous or low-crystalline allophane, imogolite, etc.

The component (A) is contacted with the components (B) and (C), and it is desirable that clay, clay minerals and ion-exchanging layered compounds for the component (A) are chemically treated for the purpose of removing impurities from them or for modifying their structures and functions.

The chemical treatment referred to herein indicates both the surface treatment to remove impurities from surfaces and the treatment to modify the crystal structure of clay. Concretely, it includes acid treatment, alkali treatment, salt treatment, organic treatment, etc.

The acid treatment is to remove impurities from surfaces, while releasing cations such as aluminium, iron, magnesium and the like from crystal structures to thereby enlarge surface areas. The alkali treatment is to destroy the crystal structure of clay, thereby modifying the structure of clay. The salt treatment and the organic treatment are to form ionic complexes, molecular complexes, organic complexes, etc., whereby surface areas and layer-to-layer spaces maybe changed. Owing to their ion-exchanging ability, the interlayer exchangeable ions in the compounds may be exchanged with any other bulky ions to give layered substances having enlarged interlayer spaces.

(3) The substances of the component (A) noted above may be directly used as they are, or, if desired, additional water may be adsorbed onto them, or they may be heated and dehydrated prior to being used.

(4) As the component (A), preferred are clay and clay minerals. Most preferred are phyllosilicic acid compounds, of which smectite is desirable, and montmorillonite is more desirable. Organic silane compounds for component (B):

Silane compounds are usable herein as the component (B) including, for example, trialkylsilylchlorides such as trimethylsilylchloride, triethylsilylchloride, triisopropylsilyl chloride, tert-butyldimethylsilyl chloride, tert-butyldiphenylsilylchloride, phenethyldimethylsilylchloride, etc.; dialkylsilyldichlorides such as dimethylsilyldichloride, diethylsilyldichloride, diisopropylsilyldichloride, bisdiphenethylsilyldichloride, methylphenethylsilyldichloride, diphenylsilyldichloride, dimethylsilyldichloride, ditolylsilyldichloride, etc.; alkylsilyltrichlorides such as methylsilyltrichloride, ethylsilyltrichloride, isopropylsilyltrichloride, phenylsilyltrichloride, mesitylsilyl trichloride, tolylsilyltrichloride, phenethylsilyltrichloride, etc.; other halides to be derived from the compounds noted above by substituting the chloride moiety with any other halogens; silylamines such as bis(trimethylsilyl)amine, bis(triethylsilyl)amine, bis(triisopropylsilyl)amine, bis(dimethylethylsilyl)amine, bis(diethylmethylsilyl)amine, bis(dimethylphenylsilyl)amine, bis(dimethyltolylsilyl)amine, bis(dimethylmesitylsilyl)amine, (dimethylamino)trimethylsilane, (diethylamino)trimethylsilane, N-(trimethylsilyl)imidazole, etc.; polysilanols generally referred to as peralkylpolysiloxypolyols; silanols such as tris(trimethylsiloxy)silanol, etc.; silylamides such as N,O-bis(trimethylsilyl)acetamide, bis(trimethylsilyl)trifluoroacetamide, bis(trimethylsilyl)acetamide, bis(trimethylsilyl)urea, trimethylsilyldiphenylurea, etc.; linear siloxanes such as 1,3-dichlorotetramethyldisiloxane, etc.; cyclic siloxanes such as hexamethyltrisiloxane, etc.; tetraalkylsilanes such as dimethyldiphenylsilane, diethyldiphenylsilane, diisopropydiphenylsilane, etc.; and trialkylsilanes such as trimethylsilane, triethylsilane, triisopropylsilane, tri-t-butylsilane, triphenylsilane, tritolylsilane, trimesitylsilane, methyldiphenylsilane, dinaphthylmethylsilane, bis(diphenyl)methylsilane, etc. Of those, preferred are organic silane compounds having at least one alkyl group directly bonded to the silicon atom. More preferred are alkylsilyl halides, and even more preferred are dialkylsilyl halides. One of those compounds may be used as the component (C). As the case may be, however, two or more of the compounds may be used, as combined in any desired manner.

The catalyst of the invention contains the product to be prepared by contacting the components (A), (B) and (C) with each other. The product may be hereinafter referred to as a silane compound-processed clay. The components (A), (B) and (C) may be contacted with each other in air or in an inert atmosphere of argon, nitrogen or the like. Preferably, they are contacted with each other in an inert atmosphere.

Where the components (A) and (B) are contacted with each other, the ratio of the two components is preferably so controlled that the amount of the component (B) is from 0.001 to 1000 mols, more preferably from 0.01 to 100 mols in terms of the silicon atom, relative to 1 kg of the component (A).

Water for the component (C) may be derived from the component (A) or (B) that naturally contains water, or additional water may be added to the system from an external source. In the case where additional water is added thereto from an external source, the component (C), water may be previously added to any of the component (A) or (B) before the components (A) and (B) are contacted with each other, or may be added to the components (A) and (B) after the two components have been contacted with each other. Preferably, the component (A) and the component (C) are first contacted with each other and then with the component (B), or the components (A), (B) and (C) are contacted with each other all at a time.

The component (C), water breaks the crystal structure (especially the layered crystal structure) of clay, clay minerals and ion-exchanging layered compounds, thereby enhancing the contact efficiency between silane compounds and the thus-broken clay, clay minerals and ion-exchanging layered compounds. Specifically, water expands the layer-to-layer spaces in the crystal structure of clay, clay minerals and ion-exchanging layered compounds, thereby promoting the diffusion of a silane compound into the thus-expanded spaces in the crystal structure of those substances. Accordingly, the presence of water in the step of contacting clay, clay minerals and ion-exchanging layered compounds with a silane compound is important, and a larger amount of water existing in the step produces better results in the invention.

The amount of the component (C), water is preferably at least 1% by weight, more preferably at least 10% by weight, even more preferably at least 100% by weight, relative to the dry weight of the component (A). Anyhow, it is necessary to positively make water present in the step of contacting the components (A) and (B) with each other.

The dry weight of the component (A) is measured as follows: A sample of the component (A) is heated up to 150° C. in a muffle furnace over a period of 30 minutes, and kept at the temperature for 1 hour, and its weight is measured. This indicates the dry weight of the component (A).

Water for the component (C) may be derived from the component (A) that naturally contains water, which is desirable for simplified operation. If, however, the system requires additional water, the component (A) may be suspended in water, or may be suspended in a mixture of water and an organic solvent. The organic solvent includes, for example, alcohols, esters, ethers, halogenohydrocarbons, aliphatic hydrocarbons, aromatic hydrocarbons. The temperature at which the catalytic components are contacted with each other in the presence of water preferably falls between −30° C. and the boiling point of the solvent used.

Transition Metal Complexes for Component (D):

Various type of transition metal complexes are usable as the component (B) in the invention, for which, however, preferred are compounds of transition metals of Groups 4 to 6 of the Periodic Table and those of Groups 8 to 10. As the compounds of transition metals of Groups 4 to 6 of the Periodic Table, preferred are those of the following general formulae (I-1) to (I-3); and as the compounds of transition metals of Group 8 to 10 of the Periodic Table, preferred are those of the following general formula (I-4).

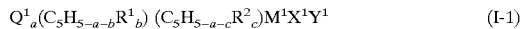  (I-1)

  (I-2)

  (I-3)

  (I-4)

where $Q^1$ represents a bonding group that crosslinks the two conjugated five-membered cyclic ligands $(C_5H_{5-a-b}R^1_b)$ and $(C_5H_{5-a-c}R^2_c)$;

$Q^2$ represents a bonding group that crosslinks the conjugated five-membered cyclic ligand $(C_5H_{5-a-d}R^3_d)$ and the group $Z^1$;

$R^1$, $R^2$, $R^3$ and $R^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure;

a represents 0, 1 or 2;

b, c and d each represent an integer of from 0 to 5 when a=0, or an integer of from 0 to 4 when a=1, or an integer of from 0 to 3 when a=2;

e represents an integer of from 0 to 5;

$M^1$ represents a transition metal of Groups 4 to 6 of the Periodic Table;

$M^2$ represents a transition metal of Groups 8 to 10 of the Periodic Table;

$L^1$ and $L^2$ each represent a coordination-bonding ligand; $X^1$, $Y^1$, $Z^1$ and $W^1$ each represent a covalent-bonding or ionic-bonding ligand; and $L^1$, $L^2$, $X^1$, $Y^1$ and $W^1$ may be bonded to each other to form a cyclic structure.

Specific examples of $Q^1$ and $Q^2$ include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group (e.g., a lower alkyl group, a phenyl group, a hydrocarbyloxy group (preferably, a lower alkoxy group), etc.) containing germanium, phosphorus, nitrogen, boron or aluminium, such as a $(CH_3)_2Ge$ group, a $(C_6H_5)_2Ge$ group, a $(CH_3)P$ group, a $(C_6H_5)P$ group, a $(C_4H_9)N$ group, a $(C_6H_5)N$ group, a $(CH_3)B$ group, a $(C_4H_9)B$ group, a $(C_6H_5)B$ group, a $(C_6H_5)Al$ group, a $(CH_3O)Al$ group, etc. Of those, preferred are alkylene groups and silylene groups.

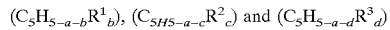

are conjugated, 5-membered cyclic ligands, in which $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a=0, or an integer of from 0 to 4 when a=1, or a integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of $—Si(R^5)(R^6)(R^7)$, in which $R^5$, $R^6$ and $R^7$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of $—P(R^8)(R^9)$, $—N(R^8)(R^9)$, and $—B(R^8)(R^9)$, respectively, in which $R^8$ and $R^9$ each represent a hydrocarbon group having from 1 to 18 carbon atoms. Plural $R^1$'s, $R^2$'s and $R^3$'s, if any, may be the same or different ones, respectively. In formula (I-1), the conjugated, 5-membered cyclic ligands $(C_5H_{5-a-b}R^1b)$ and $(C_5H_{5-a-c}R^2_c)$ may be the same or different ones.

$M^1$ represents a transition metal element of Groups 4 to 6 of the Periodic Table, including, for example, titanium, zirconium, hafnium, niobium, molybdenum, tungsten, etc. Of those, preferred are titanium, zirconium and hafnium, and more preferred is zirconium. $Z^1$ represents a covalent-bonding ligand, including, for example, an oxygen atom (—O—), a sulfur atom (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms (e.g., a t-butylamino group, a t-butylimino group, etc.), and a phosphorus-containing hydrocarbon group having from 1 to 40, preferably from 1 to 18 carbon atoms. $X^1$ and $Y^1$ each represent a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different ones.

In formula (I-3), $M^1$ represents a transition metal of Groups 4 to 6 of the Periodic Table, such as that mentioned above; X1 represents a covalent-bonding ligand and is concretely a halogen atom or an alkoxy group.

(I) As specific examples of the transition metal compounds of formulae (I-1) and (I-2), mentioned are the following compounds.

(1) Transition metal compounds not having a crosslinkable bonding group but having two conjugated, 5-membered cyclic ligands, such as bis(cyclopentadienyl)titaniumdichloride, bis(methylcyclopentadienyl)titaniumdichloride, bis(dimethylcyclopentadienyl)titaniumdichloride, bis(trimethylcyclopentadienyl)titaniumdichloride, bis(tetramethylcyclopentadienyl)titaniumdichloride, bis(pentamethylcyclopentadienyl)titaniumdichloride, bis(n-butylcyclopentadienyl)titaniumdichloride, bis(indenyl)titaniumdichloride, bis(fluorenyl)titaniumdichloride, bis(cyclopentadienyl)titaniumchlorohydride, bis(cyclopentadienyl)methyltitaniumchloride, bis(cyclopentadienyl)ethyltitaniumchloride, bis(cyclopentadienyl)phenyltitaniumchloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)(indenyl)titaniumdichloride, (cyclopentadienyl)(fluorenyl)titanium dichloride, etc.

(2) Transition metal compounds having two conjugated, 5-membered cyclic ligands, in which the two ligands are crosslinked with an alkylene group, such as methylenebis(indenyl)titaniumdichloride, ethylenebis(indenyl)titaniumdichloride, methylenebis(indenyl)titaniumchlorohydride, ethylenebis(indenyl)methyltitaniumchloride, ethylenebis(indenyl)methoxychlorotitanium, ethylenebis(indenyl)titaniumdiethoxide, ethylenebis(indenyl)dimethyltitanium, ethylenebis(4,5,6,7-tetrahydroindenyl)titaniumdichloride, ethylenebis(2-methylindenyl)titaniumdichloride, ethylenebis(2,4-dimethylindenyl)titaniumdichloride, ethylenebis(2-methyl-4-trimethylsilylindenyl)titaniumchloride, ethylenebis(2,4-dimethyl-5,6,7-trihydroindenyl)titaniumdichloride, ethylene(2,4-dimethylcyclopentadienyl)(3',5'-dimethylcyclopentadienyl)titaniumdichloride, ethylene(2-methyl-4-t-butylcyclopentadienyl)(3'-t-butyl-5'-methylcyclopentadienyl)titaniumdichloride, ethylene(2,3,5-trimethylcyclopentadienyl)(2',4',5'-trimethylcyclopentadienyl)titaniumdichloride, isopropylidenebis(2-methylindenyl)titaniumdichloride, isopropylidenebis(indenyl)titaniumdichloride, isopropylidenebis(2,4-dimethylindenyl)titanium dichloride, isopropylidene(2,4-dimethylcyclopentadienyl)(3',5'-dimethylcyclopentadienyl)titaniumdichloride, isopropylidene(2-methyl-4-t-butylcyclopentadienyl)(3'-t-butyl-5'-methylcyclopentadienyl)titaniumdichloride, methylene(cyclopentadienyl)(3,4-dimethylcyclopentadienyl)titaniumdichloride, methylene(cyclopentadienyl)(3,4-dimethylcyclopentadienyl)titaniumchlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)(trimethylcyclopentadienyl)titaniumdichloride, methylene(cyclopentadienyl)(tetramethylcyclopentadienyl)titaniumdichloride, isopropylidene(cyclopentadienyl)(3,4-dimethylcyclopentadienyl)titaniumdichloride, isopropylidene(cyclopentadienyl)(2,3,4,5-tetramethylcyclopentadienyl)titaniumdichloride, isopropylidene(cyclopentadienyl)(3-methylindenyl)titaniumdichloride, isopropylidene(cyclopentadienyl)(fluorenyl)titaniumdichloride, isopropylidene(2-ethylcyclopentadienyl)(fluorenyl)titaniumdichloride, isopropylidene(2,5-dimethylcyclopentadienyl)(3,4-dimethylcyclopentadienyl)titaniumdichloride, isopropylidene(2,5-dimethylcyclopentadienyl)(fluorenyl)titaniumdichloride, ethylene(cyclopentadienyl)(3,5-dimethylcyclopentadienyl)titaniumdichloride, ethylene(cyclopentadienyl)(fluorenyl)titaniumdichloride, ethylene(2,5-dimethylcyclopentadienyl)(fluorenyl)titaniumdichloride, ethylene(2,5-diethylcyclopentadienyl)(fluorenyl)titaniumdichloride, diphenylmethylene(cyclopentadienyl)(3,4-diethylcyclopentadienyl)titaniumdichloride, diphenylmethylene(cyclopentadienyl)(3,4-diethylcyclopentadienyl)titaniumdichloride, cyclohexylidene(cyclopentadienyl)(fluorenyl)titaniumdichloride, cyclohexylidene(2,5-dimethylcyclopentadienyl) (3',4'-dimethylcyclopentadienyl)titanium dichloride, etc.

(3) Transition metal compounds having two silylene-crosslinked, conjugated, 5-membered cyclic ligands, such as dimethylsilylenebis(indenyl)titaniumdichloride, dimethylsilylenebis(4,5,6,7-tetrahydroindenyl)titaniumdichloride, dimethylsilylenebis(2-methylindenyl)titaniumdichloride, dimethylsilylenebis(2,4-dimethylindenyl)titaniumdichloride, dimethylsilylenebis(2-methyl-4-phenylindenyl)titaniumdichloride, dimethylsilylenebis(2-methyl-4-naphthylindenyl)titaniumdichloride, dimethylsilylenebis(2-methyl-4,5-benzindenyl)titaniumdichloride, dimethylsilylenebis(2,4-dimethylcyclopentadienyl)(3',5'-dimethylcyclopentadienyl)titaniumdichloride, phenylmethylsilylenebis(indenyl)titaniumdichloride, phenylmethylsilylenebis(4,5,6,7-tetrahydroindenyl)titanium-dichloride, phenylmethylsilylenebis(2,4-dimethylindenyl)titaniumdichloride, phenylmethylsilylene(2,4-dimethylcyclopentadienyl)
(3',5'-dimethylcyclopentadienyl)titaniumdichloride,
phenylmethylsilylene(2,3,5-trimethylcyclopentadienyl)(2',4',5'-trimethylcyclopentadienyl)titaniumdichloride,
phenylmethylsilylenebis(tetramethylcyclopentadienyl)
titaniumdichloride, diphenylsilylenebis(2,4-dimethylindenyl)titaniumdichloride,
diphenylsilylenebis(indenyl)titaniumdichloride,
diphenylsilylenebis(2-methylindenyl)
titaniumdichloride, tetramethyldisilylenebis(indenyl)
titaniumdichloride, tetramethyldisilylenebis
(cyclopentadienyl)titaniumdichloride,
tetramethyldisilylene(3-methylcyclopentadienyl)
(indenyl)titaniumdichloride, dimethylsilylene
(cyclopentadienyl)(3,4-dimethylcyclopentadienyl)
titaniumdichloride, dimethylsilylene(cyclopentadienyl)
(trimethylcyclopentadienyl)titaniumdichloride,
dimethylsilylene(cyclopentadienyl)
(tetramethylcyclopentadienyl)titaniumdichloride,
dimethylsilylene(cyclopentadienyl)(3,4-diethylcyclopentadienyl)titaniumdichloride,
dimethylsilylene(cyclopentadienyl)
(triethylcyclopentadienyl)titaniumdichloride,
dimethylsilylene(cyclopentadienyl)
(tetraethylcyclopentadienyl)titaniumdichloride,
dimethylsilylene(cyclopentadienyl)(fluorenyl)
titaniumdichloride, dimethylsilylene(cyclopentadienyl)
(2,7-di-t-butylfluorenyl)titaniumdichloride,
dimethylsilylene(cyclopentadienyl)
(octahydrofluorenyl)titaniumdichloride,
dimethylsilylene(2-methylcyclopentadienyl)
(fluorenyl)titaniumdichloride, dimethylsilylene(2,5-dimethylcyclopentadienyl)(fluorenyl)
titaniumdichloride, dimethylsilylene(2-ethylcyclopentadienyl) (fluorenyl)titaniumdichloride,
dimethylsilylene(2,5-diethylcyclopentadienyl)
(fluorenyl)titaniumdichloride, diethylsilylene(2-methylcyclopentadienyl)(2',7'-di-t-butylfluorenyl)
titaniumdichloride, dimethylsilylene(2,5-dimethylcyclopentadienyl)(2',7'-di-t-butylfluorenyl)
titaniumdichloride, dimethylsilylene(2-ethylcyclopentadienyl)(2',7'-di-t-butylfluorenyl)
titaniumdichloride, dimethylsilylene
(diethylcyclopentadienyl)(2,7-di-t-butylfluorenyl)
titaniumdichloride, dimethylsilylene
(methylcyclopentadienyl)(octahydrofluorenyl)
titaniumdichloride, dimethylsilylene
(dimethylcyclopentadienyl)(octahydrofluorenyl)
titaniumdichloride, dimethylsilylene
(ethylcyclopentadienyl)(octahydrofluorenyl)
titaniumdichloride, dimethylsilylene
(diethylcyclopentadienyl)(octahydrofluorenyl)titanium
dichloride, etc.

(4) Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl) titaniumdichloride, dimethylgermylene (cyclopentadienyl)(fluorenyl)titaniumdichloride, methylalumylenebis(indenyl)titaniumdichloride, phenylalumylenebis(indenyl)titaniumdichloride, phenylphosphylenebis(indenyl)titaniumdichloride, ethylborylenebis(indenyl)titaniumdichloride, phenylaminylenebis(indenyl)titaniumdichloride, phenylalumylene(cyclopentadienyl)(fluorenyl)titaniumdichloride, etc.

(5) Transition metal compounds having one conjugated, 5-membered cyclic ligand, such as pentamethylcyclopentadienyl (diphenyl)aminotitaniumdichloride, indenyl-(diphenyl)aminotitaniumdichloride, pentamethylcyclopentadienylbis(trimethylsilyl) aminotitaniumdichloride, pentamethylcyclopentadienylphenoxytitaniumdichloride, dimethylsilylene(tetramethylcyclopentadienyl) phenylaminotitaniumdichloride, dimethylsilylene (tetramethylcyclopentadienyl)-t-butylaminotitaniumdichloride, dimethylsilylene (tetrahydroindenyl)decylaminotitaniumdichloride, dimethylsilylene(tetrahydroindenyl)[bis(trimethylsilyl) amino]titaniumdichloride, dimethylgermylene (tetramethylcyclopentadienyl) phenylaminotitaniumdichloride, pentamethylcyclopentadienyltitaniumtrimethoxide, pentamethylcyclopentadienyltitanium trichloride, etc.

(6) Transition metal compounds having two conjugated, 5-membered cyclic ligands in which the ligands are double-crosslinked, such as (1,1'-dimethylsilylene)(2, 2'-dimethylsilylene)bisindenyltitaniumdichloride, (1,1'-dimethylsilylene)(2,2'-isopropylene)bis (cyclopentadienyl)titaniumdichloride, (1,1'-dimethylsilylene)(2,2'-dimethylsilylene)bis (cyclopentadienyl)titaniumdichloride, (1,1'-dimethylsilylene)(2,2'-isopropylidene)bis (cyclopentadienyl)dimethyltitanium, (1,1'-dimethylsilylene)(2,2'-isopropylidene)bis (cyclopentadienyl)dibenzyltitanium, (1,1'-dimethylsilylene)(2,2'-isopropylidene)bis (cyclopentadienyl)bis(trimethylsilyl)titanium, (1,1'-dimethylsilylene)(2,2'-isopropylidene)bis (cyclopentadienyl)bis(trimethylsilylmethyl)titanium, (1,2'-dimethylsilylene)(2,1'-ethylene)bis(indenyl) titaniumdichloride, (1,1'-dimethylsilylene)(2,2'-ethylene)bis(indenyl)titaniumdichloride, (1,1'-ethylene)(2,2'-dimethylsilylene)bis(indenyl) titaniumdichloride, (1,1'-dimethylsilylene)(2,2'-cyclohexylidene)bis(indenyl)titanium dichloride, etc.

(7) Derivatives from compounds of (1) to (6) noted above, which are produced by substituting the chlorine atoms in those compounds of (1) to (6) with any of a bromine atom, an iodine atom, a hydrogen atom, a methyl group, a phenyl group and others, and by substituting the center metal, titanium in those transition metal compounds with any of zirconium, hafnium, niobium, molybdenum, tungsten and others.

(8) Of the compounds of (1) to (7), the transition metal compounds having one conjugated, 5-membered cyclic ligand of (5) are especially preferably employed in producing styrenic polymers having a syndiotactic structure.

(II) As specific examples of the transition metal compounds of formula (I-3), mentioned are the following compounds.

(1) Transition metal compounds having a ligand, such as cyclopentadienyltitaniumtrichloride, methylcyclopentadienyltitaniumtrichloride, dimethylcyclopentadienyltitaniumtrichloride, trimethylcyclopentadienyltitaniumtrichloride, tetramethylcyclopentadienyltitaniumtrichloride, pentamethylcyclopentadienyltitaniumtrichloride, n-butylcyclopentadienyltitaniumtrichloride, indenyltitanium trichloride, fluorenyltitanium trichloride, cyclopentadienyltitaniumdichlorohydride, cyclopentadienylmethyltitaniumdichloride, cyclopentadienylethyltitaniumdichloride, fluorenyltitaniumtrichloride, etc.

(2) Transition metal compounds having a ligand, such as 4,5,6,7-tetrahydroindenyltitaniumtrichloride, 2-methylindenyltitaniumtrichloride, etc.

(3) Transition metal compounds having a ligand, such as octahydrofluorenyltitaniumtrichloride, etc.

(4) Transition metal compounds having one conjugated, five-membered cyclic ligand, such as pentamethylcyclopentadienyltitaniumtrimethoxide, pentamethylcyclopentadienyltitaniumtrichloride, etc.

(5) Derivatives from compounds of (1) to (4) noted above, which are produced by substituting the chlorine atoms in those compounds of (1) to (4) with any of a bromine atom, an iodine atom, a hydrogen atom, a methyl group, a phenyl group and others, and by substituting the center metal, titanium in those transition metal compounds with any of zirconium, hafnium, niobium, molybdenum, tungsten and others.

(6) Of the compounds of (1) to (5), the transition metal compounds having one conjugated, 5-membered cyclic ligand of (4) are especially preferably employed in producing styrenic polymers having a syndiotactic structure.

(III) In the transition metal compounds of formula (I-4), $M^2$ represents a transition metal of Groups 8 to 10 of the Periodic Table, concretely including cobalt, nickel, palladium, platinum, etc. Of those, preferred are nickel and palladium. $L^1$ and $L^2$ each represents a coordination-bonding ligand; and $X^1$ and $Y^1$ each represent a covalent-bonding or ionic-bonding ligand. As mentioned hereinabove, $X^1$ and $Y^1$ include, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different ones. Specific examples of $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, bistrimethylsilylaminobistrimethylsilyliminophosphorane, etc.

$L^1$, $L^2$, $X^1$ and $Y^1$ may be bonded to each other to form a cyclic structure.

The compounds of transition metals of Groups 8 to 10 of the Periodic Table preferably have a diimine compound as the ligand, including, for example, complex compounds of a general formula (I-5):

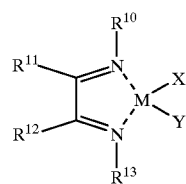

(I-5)

wherein $R^{10}$ and $R^{13}$ each independently represent an aliphatic hydrocarbon group having from 1 to 20 carbon atoms, or an aromatic group having a hydrocarbon group on the ring and having from 7 to 20 carbon atoms in total; $R^{11}$ and $R^{12}$ each independently represent a hydrogen atom, or a hydrocarbon group having from 1 to 20 carbon atoms, and $R^{11}$ and $R^{12}$ may be bonded to each other to form a ring; X and Y each independently represent a hydrogen atom, or a hydrocarbon group having from 1 to 20 carbon atoms; and M represents a transition metal of Groups 8 to 10 of the Periodic Table.

In formula (I-5), the aliphatic hydrocarbon group having from 1 to 20 carbon atoms for $R^{10}$ and $R^{13}$ may be a linear or branched alkyl group having from 1 to 20 carbon atoms or a cycloalkyl group having from 3 to 20 carbon atoms, concretely including a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, and a cyclooctyl group, etc. Into the ring of the cycloalkyl group, a suitable substituent such as a lower alkyl group may be introduced. The aromatic group having a hydrocarbon group on the ring and having from 7 to 20 carbon atoms in total includes, for example, phenyl and naphthyl groups with at least one linear, branched or cyclic C1–10 alkyl group being on the aromatic ring. For $R^{10}$ and $R^{13}$, preferred is an aromatic group having a hydrocarbon group on the ring, and especially preferred is a 2,6-diisopropylphenylgroup. $R^{10}$ and $R^{13}$ may be the same or different.

The hydrocarbon group having from 1 to 20 carbon atoms for $R^{11}$ and $R^{12}$ includes, for example, a linear or branched alkyl group having from 1 to 20 carbon atoms, a cycloalkyl group having from 3 to 20 carbon atoms, an aryl group having from 6 to 20 carbon atoms, and an aralkyl group having from 7 to 20 carbon atoms. For examples of the linear or branched alkyl group having from 1 to 20 carbon atoms and the cycloalkyl group having from 3 to 20 carbon atoms for $R^{11}$ and $R^{12}$, referred to are those of the C1–20 aliphatic hydrocarbon group mentioned hereinabove for $R^{10}$ and $R^{13}$. The aryl group having from 6 to 20 carbon atoms includes, for example, a phenyl group, a tolyl group, a xylyl group, a naphthyl group, a methylnaphthyl group, etc.; and the aralkyl group having from 7 to 20 carbon atoms includes, for example, a benzyl group, a phenethyl group, etc. $R^{10}$ and $R^{11}$ may be the same or different, and may be bonded to each other to form a ring.

For examples of the hydrocarbon group having from 1 to 20 carbon atoms for X and Y, referred to are those of the C1–20 hydrocarbon group mentioned hereinabove for $R^{11}$ and $R^{12}$. For X and Y, especially preferred is a methyl group. X and Y may be the same or different.

The transition metal of Groups 8 to 10 of the Periodic Table for M includes, for example, nickel, palladium, platinum, iron, cobalt, rhodium, ruthenium, etc. Preferred are nickel and palladium.
Specific examples of the complex compounds of formula (I-5) are compounds of the following formulae [1], [2], [3], [4], [5], [6], [7], [8], [9], [10], [11] and [12].
[1]
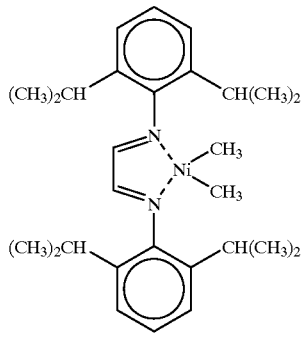
[2]
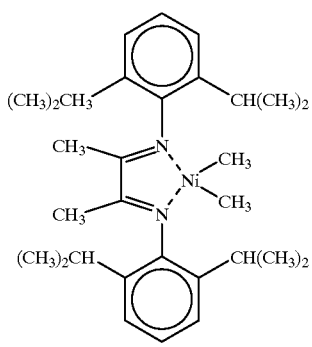
[3]
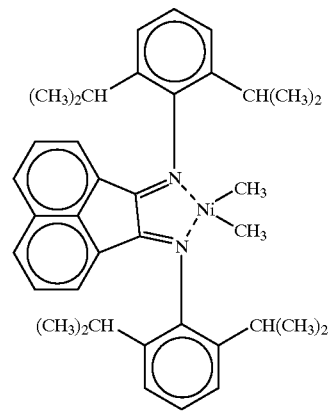
(4)
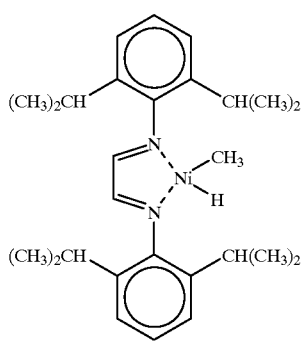
-continued
[5]
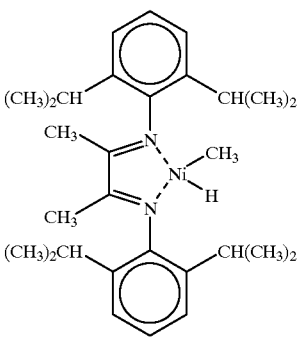
[6]
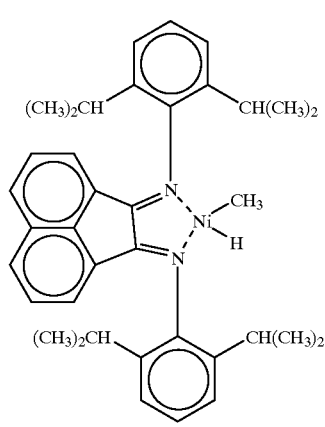
[7]
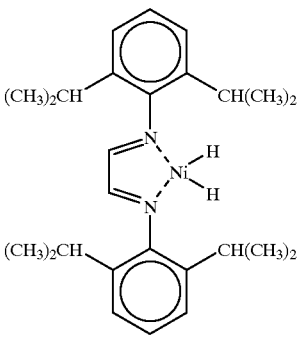
(8)
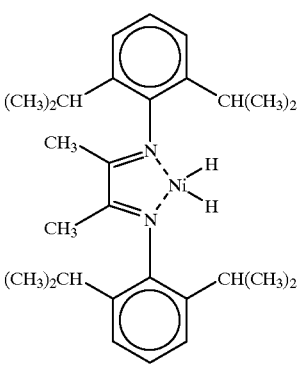

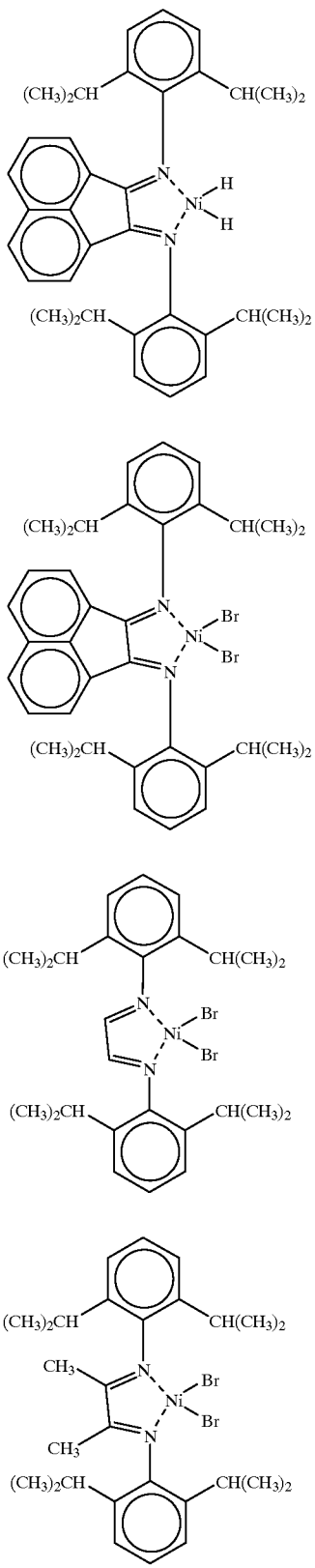

In the invention, one or more of the complex compounds noted above may be used either singly or as combined.

Specific examples of the transition metal compounds of formula (I-4) include dibromobistriphenylphosphine nickel, dichlorobistriphenylphosphinenickel, dibromodiacetonitrilenickel, dibromodibenzonitrilenickel, dibromo(1,2-bisdiphenylphosphinoethane)nickel, dibromo (1,3-bisdiphenylphosphinopropane)nickel, dibromo(1,1'-diphenylbisphosphinoferrocene)nickel, dimethylbisdiphenylphosphinenickel, dimethyl(1,2-bisdiphenylphosphinoethane)nickel, methyl(1,2-bisdiphenylphosphinoethano)nickeltetrafluoroborate, (2-diphenylphosphino-1-phenylethyleneoxy) phenylpyridine-nickel, dichlorobistriphenylphosphinepalladium, dichlorodibenzonitrilepalladium, dichlorodiacetonitrilepalladium, dichloro(1,2-bisdiphenylphosphinoethane)palladium, bistriphenylphosphinopalladiumbistetrafluoroborate, bis(2, 2'-bipyridino)methyliron tetrafluoroborateetherate, etc. Of those, preferred are cationic complexes such as methyl(1,2-bisdiphenylphosphinoethano)nickeltetrafluoroborate, bistriphenylphosphinopalladiumbistetrafluoroborate, and bis(2,2'-bipyridino)methyliron tetrafluoroborateetherate.

In the invention, it is desirable that the component (D) is contacted with the product from the components (A), (B) and (C) in the absence of an active hydrogen which is harmful to the catalyst to be produced and which will be from water, hydroxyl groups, amino groups and others. For example, it is desirable that they are contacted with each other in an inert atmosphere of, for example, nitrogen or the like, or in a hydrocarbon of, for example, pentane, hexane, heptane, toluene, xylene or the like. If the components are contacted with each other in the presence of water, hydroxyl groups, amino groups or the like, the activity of the catalyst to be produced will be low. In general, the amount of the component (D) to be contacted with the product of the components (A), (B) and (C) may be from 0.01 to 1000 μmols, preferably from 0.1 to 200 μmols, relative to the unit weight (g) of the silane compound-processed clay.

Where the component (E) is further contacted with the components (A) to (D), it may be directly contacted with a solution of the component (D) having been contacted with the product of the components (A), (B) and (C); or, alternatively it may be separately contacted with the product of the components (A), (B) and (C) and with the component (D), and thereafter the product of (A), (B) and (C) and the component (D) thus having been contacted with the component (E) may be finally contacted with each other. The latter of previously and separately contacting the component (E) with the product of (A), (B) and (C) and with the component (D) is preferred, since active hydrogen-having compounds that are harmful to the catalyst to be formed, such as water, hydroxyl-having compounds, amino-having compounds and others, can be removed from the reaction system. In general, the amount of the component (E) to be contacted with the components (A) to (D) may be from 1 to 300 μmols, preferably from 5 to 50 μmols, relative to the unit weight (g) of the clay compound to be processed.

It is not always necessary to finish the step of contacting the component (E) with the other components in the process of producing the catalyst. As the case may be, the component (E) may be contacted with the other components in situ in the polymerization system where the catalyst to be produced is to be present.

Mixing and contacting the constituent components with each other may be effected at a temperature at which monomer polymerization is effected in the presence of the catalyst to be produced, and may also be effected at a temperature falling between −30° C. and the boiling point of the solvent used, but preferably between room temperature and the boiling point of the solvent used.

Alkylating Agent for Component (E):

In the invention, optionally used is an alkylating agent as the component (E) for the catalyst. It includes organic magnesium compounds, organic zinc compounds and organic aluminium compounds. Of those, preferred are organic aluminium compounds as being inexpensive and easily available.

As examples of organic magnesium compounds and organic zinc compounds usable herein, mentioned are the following compounds of general formulae (I-6) and (I-7):

$$R^{14}{}_2Mg \qquad (I\text{-}6))$$

wherein $R^{14}$ represents an alkyl group having from 1 to 8, preferably from 1 to 4 carbon atoms.

$$R^{14}{}_2Zn \qquad (I\text{-}7)$$

wherein $R^{14}$ represents an alkyl group having from 1 to 8, preferably from 1 to 4 carbon atoms.

The compounds include, for example, dialkylmagnesiums such as dimethylmagnesium, diethylmagnesium, di-n-propylmagnesium, diisopropylmagnesium, dibutylmagnesium, etc.; dialkylzincs such as dimethylzinc, diethylzinc, ethyl-n-propylzinc, diisopropylzinc, etc.

Organic aluminium compounds employable herein are not specifically defined. For example, preferred are alkyl-having aluminium compounds of the following general formula (I-8), linear aluminoxanes of the following general formula (I-9), and cyclic aluminoxanes and their associates of the following general formula (I-10):

$$R^{15}{}_mAl(OR^{16})_nX_{3-m-n} \qquad (I\text{-}8)$$

wherein $R^{15}$ and $R^{16}$ each represent an alkyl group having from 1 to 8, preferably from 1 to 4 carbon atoms; X represents a hydrogen atom or a halogen atom; 0<m≦3, preferably m=2 or 3, most preferably m=3; 0≦n<3, preferably n=0 or 1.

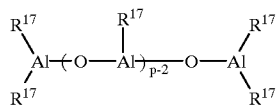

(I-9)

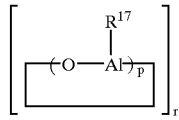

(I-10)

wherein $R^{17}$ represents an alkyl group having from 1 to 20, preferably from 1 to 8 carbon atoms, and plural $R^{17}$'s may be the same or different; p and r are integers, falling 0<p≦40, and 1<r≦50.

Examples of the compounds are trialkylaluminiums such as trimethylaluminium, triethylaluminium, tripropylaluminium, triisobutylaluminium, tri-t-butylaluminium, etc.; halogen-, alkoxy- or hydroxyl-having alkylaluminiums such as dimethylaluminiumchloride, diethylaluminiumchloride, dimethylaluminiummethoxide, diethylaluminiummethoxide, dimethylaluminiumhydroxide, diethylaluminiumhydroxide, etc.; hydrogen-having alkylaluminiums such as dimethylaluminiumhydride, diisobutylaluminiumhydride, etc.; aluminoxanes such as methylaluminoxane, ethylaluminoxane, isobutylaluminoxane, etc. Of those, preferred are trialkylaluminiums, more preferred are trimethylaluminium and triisobutylaluminium; and even more preferred is triisobutylaluminium.

In the invention, one or more of the organic aluminium compounds noted above may be used as the component (E), either singly or as combined.

2. Method for Producing Polyolefins:

In the method for producing polyolefins in the invention, favorably used is the catalyst noted above optionally along with an organic aluminium compound for homopolymerization of olefins or for copolymerization of olefins with other olefins and/or other monomers (that is, copolymerization of different types of olefins, or copolymerization of olefins with other monomers, or copolymerization of different types of olefins with other monomers).

As the organic aluminium compound, preferred are the compounds of formulae (I-8) to (I-10) mentioned above. The amount of the organic aluminium compound to be used may be generally from 0.5 to 100 μmols, preferably from 2 to 20 μmols, relative to one g of the silane compound-processed clay.

Olefins to be polymerized in the invention are not specifically defined, but preferred are α-olefins having from 2 to 20 carbon atoms. Olefins of that type include, for example, α-olefins such as ethylene, propylene, 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; and cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc. Styrenic compounds are also usable as olefins herein. They include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; and also trimethylsilylstyrene, vinylbenzoates, divinylbenzene. The other olefins to be copolymerized may be suitably selected from the olefins noted above.

In the invention, one or more olefins may be homopolymerized or copolymerized either singly or as combined. Where two or more different olefins are copolymerized, the olefins noted above may be combined in any desired manner.

In the invention, olefins such as those mentioned above may be copolymerized with any other comonomers. The comonomers include, for example, linear diolefins such as butadiene, isoprene, 1,4-pentadiene, 1,5-hexadiene, etc.;

polycyclic olefins such as norbornene, 1,4,5,8-dimethano-1,2,3,4,4a,5,8,8a-octahydronaphthalene, 2-norbornene, etc.; cyclic diolefins such as norbornadiene, 5-ethylidenenorbornene, 5-vinylnorbornene, dicyclopentadiene, etc.; and unsaturated esters such as ethyl acrylate, methyl methacrylate, etc.

The mode of olefin polymerization is not specifically defined, and herein employable is any desired polymerization mode of slurry polymerization, solution polymerization, vapor phase polymerization, bulk polymerization or suspension polymerization.

Solvents may be used in polymerization. They include, for example, hydrocarbons and halogenohydrocarbons such as benzene, toluene, xylene, n-hexane, n-heptane, cyclohexane, chloromethylene, chloroform, 1,2-dichloroethane, and chlorobenzene. One or more such solvents may be used either singly or as combined. Depending on their type, monomers to be polymerized may also serve as solvents.

In view of the catalytic activity for polymerization and of the reactor efficiency, it is desirable that the amount of the catalyst to be in the polymerization system is so controlled that the amount of the component (D) could fall generally between 0.1 and 100 μmols, but preferably between 0.5 and 25 μmols, in one liter of the solvent in the system.

Regarding the polymerization condition, the pressure may fall generally between ordinary pressure and 2000 kg/cm$^2$G. The reaction temperature may fall generally between −50 and 250° C. For controlling the molecular weight of the polymers to be produced, the type and the amount of the catalytic components to be used and the polymerization temperature will be suitably selected. If desired, hydrogen may be introduced into the polymerization system for that purpose.

SECOND ASPECT OF THE INVENTION

1. Constituent Components for Olefin Polymerization Catalyst:

The catalyst for olefin polymerization of the second aspect of the invention (this will be simply referred to as "the invention" in this section) is prepared by contacting (a) a transition metal compound with a silane compound-processed clay as prepared by contacting an aqueous dispersion of (b) water-swellable clay with (c) a silane compound, to which is optionally added (d) an organic metal compound with a metal of Groups 1, 2, 13 and 14 of the Periodic Table.

Constituent components that are favorably used for preparing the catalyst are mentioned below.

(a) Transition Metal Compounds:

As the component (a) in the invention, usable are compounds of transition metals of Groups 4 to 6 or Groups 8 to 10 of the Periodic Table. As the compounds of transition metals of Groups 4 to 6 of the Periodic Table for use herein, preferred are those of the following general formulae (II-3) to (II-5) in view of their activity; and as the compounds of transition metals of Groups 8 to 10 of the Periodic Table, preferred are those of the following general formula (II-6) also in view of their activity.

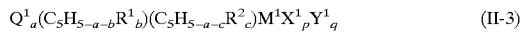  (II-3)

  (II-4)

$M^1X^2_r$  (II-5)

$L^1L^2M^2X^2_uY^2_v$  (II-6)

wherein $Q^1$ represents a bonding group that crosslinks the two conjugated, 5-membered cyclic ligands ($C_5H_{5-a-b}R^1_b$) and ($C_5H_{5-a-c}R^2_c$);

$Q^2$ represents a bonding group that crosslinks the conjugated, 5-membered cyclic ligand ($C_5H_{5-a-d}R^3_d$) and the group $Z^1$;

$R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group;

a represents 0, 1 or 2;

b, c and d each represent an integer of from 0 to 5 when a=0, or an integer of from 0 to 4 when a=1, or a integer of from 0 to 3 when a=2;

(p+q) equals the valence number of $M^1$ minus 2;

r equals the valence number of $M^1$;

$M^1$ represents a transition metal of Groups 4 to 6 of the Periodic Table;

$M^2$ represents a transition metal of Groups 8 to 10 of the Periodic Table;

(u+v) equal the valence number of $M^2$;

$L^1$ and $L^2$ each represent a coordination-bonding ligand;

$X^1$, $Y^1$, $Z^1$, $X^2$ and $Y^2$ each represent a covalent-bonding or ionic-bonding ligand;

$L^1$, $L^2$, $X^1$ and $Y^2$ may be bonded to each other to form a cyclic structure.

Specific examples of $Q^1$ and $Q^2$ include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group (e.g., a lower alkyl group, a phenyl group, a hydrocarbyloxy group (preferably, a lower alkoxy group), etc.) containing germanium, phosphorus, nitrogen, boron or aluminium, such a sa $(CH_3)_2Ge$ group, a $(C_6H_5)_2Ge$ group, a $(CH_3)P$ group, a $(C_6H_5)P$ group, a $(C_4H_9)N$ group, a $(C_6H_5)N$ group, a $(CH_3)B$ group, a $(C_4H_9)B$ group, a $(C_6H_5)B$ group, a $(C_6H_5)Al$ group, a $(CH_3O)Al$ group, etc. Of those, preferred are alkylene groups and silylene groups in view of the activity of the intended catalysts.

($C_5H_{5-a-b}R^1_b$), ($C_5H_{5-a-c}R^2_c$) and ($C_5H_{5-a-d}R^3_d$) are conjugated, 5-membered cyclic ligands, in which $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a=0, or an integer of from 0 to 4 when a=1, or a integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of —Si($R^4$)($R^5$)($R^6$), in which $R^4$, $R^5$ and $R^6$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of —P($R^7$)($R^8$), —N($R^7$)($R^8$), and —B($R^7$)($R^8$), respectively, in which $R^7$ and $R^8$ each represent a hydrocarbon group having from 1 to 18 carbon atoms. Plural $R^1$'s, $R^2$'s and $R^3$'s, if any, may be the same or different ones, respectively. In formula (II-3), the conjugated, 5-membered cyclic ligands ($C_5H_{5-a-b}R^1_b$) and ($C_5H_{5-a-c}R^2_c$) may be the same or different ones.

$M^1$ represents a transition metal element of Groups 4 to 6 of the Periodic Table, including, for example, titanium, zirconium, hafnium, vanadium, niobium, molybdenum, tungsten, etc. Of those, preferred are titanium, zirconium and hafnium in view of the activity of the intended catalysts. $Z^1$ represents a covalent-bonding ligand, including, for example, a halogen atom, an oxygen atom (—O—), a sulfur atom (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms (e.g., a t-butylamino group, a t-butylimino group, etc.), and a phosphorus-containing hydrocarbon group having from 1 to 40, preferably from 1 to 18 carbon atoms. $X^1$ and $Y^1$ each represent a covalent-bonding ligand or an ionic-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., B($C_6H_5$)$_4$, $BF_4$). Of those, preferred are halogen atoms and hydrocarbon groups. $X^1$ and $Y^1$ may be the same or different ones. $X^2$ represents a covalent-bonding ligand, including, for example, a halogen atom, a hydrocarbylamino group, or a hydrocarbyloxy group, and is preferably an alkoxy group.

(I) As specific examples of the transition metal compounds of formulae (II-3) and (II-4), mentioned are the following compounds.

(1) Transition metal compounds not having a crosslinkable bonding group but having two conjugated, 5-membered cyclic ligands, such as bis(cyclopentadienyl)titaniumdichloride, bis(methylcyclopentadienyl)titaniumdichloride, bis(dimethylcyclopentadienyl)titaniumdichloride, bis(trimethylcyclopentadienyl)titaniumdichloride, bis(tetramethylcyclopentadienyl)titaniumdichloride, bis(pentamethylcyclopentadienyl)titaniumdichloride, bis(n-butylcyclopentadienyl)titaniumdichloride, bis(indenyl)titaniumdichloride, bis(fluorenyl)titaniumdichloride, bis(cyclopentadienyl)titaniumchlorohydride, bis(cyclopentadienyl)methyltitaniumchloride, bis(cyclopentadienyl)ethyltitaniumchloride, bis(cyclopentadienyl)phenyltitaniumchloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)(indenyl)titaniumdichloride, (cyclopentadienyl)(fluorenyl)titaniumdichloride, bis(cyclopentadienyl)zirconiumdichloride, bis(methylcyclopentadienyl)zirconiumdichloride, bis(dimethylcyclopentadienyl)zirconiumdichloride, bis(trimethylcyclopentadienyl)zirconiumdichloride, bis(tetramethylcyclopentadienyl)zirconiumdichloride, bis(pentamethylcyclopentadienyl)zirconiumdichloride, bis(n-butylcyclopentadienyl)zirconiumdichloride, bis(indenyl)zirconiumdichloride, bis(fluorenyl)zirconiumdichloride, bis(cyclopentadienyl)zirconiumchlorohydride, bis(cyclopentadienyl)methylzirconiumchloride, bis(cyclopentadienyl)ethylzirconiumchloride, bis(cyclopentadienyl)phenylzirconiumchloride, bis(cyclopentadienyl)dimethylzirconium, bis(cyclopentadienyl)diphenylzirconium, bis(cyclopentadienyl)dineopentylzirconium, bis(cyclopentadienyl)dihydrozirconium, (cyclopentadienyl)(indenyl)zirconiumdichloride, (cyclopentadienyl)(fluorenyl)zirconiumdichloride, etc.

(2) Transition metal compounds having two conjugated, 5-membered cyclic ligands, in which the two ligands are crosslinked with an alkylene group, such as methylenebis(indenyl)titaniumdichloride, ethylenebis(indenyl)titaniumdichloride, methylenebis(indenyl)titaniumchlorohydride, ethylenebis(indenyl)methyltitaniumchloride, ethylenebis(indenyl)methoxychlorotitanium, ethylenebis(indenyl)titaniumdiethoxide, ethylenebis(indenyl)dimethyltitanium, ethylenebis(4,5,6,7-tetrahydroindenyl)titaniumdichloride, ethylenebis(2-methylindenyl)titaniumdichloride, ethylenebis(2,4-dimethylindenyl)titaniumdichloride, ethylenebis(2-methyl-4-trimethylsilylindenyl)titaniumdichloride, ethylenebis(2,4-dimethyl-5,6,7-trihydroindenyl)titaniumdichloride, ethylene(2,4-dimethylcyclopentadienyl)(3',5'-dimethylcyclopentadienyl)titaniumdichloride, ethylene(2-methyl-4-t-butylcyclopentadienyl)(3'-t-butyl-5'-methylcyclopentadienyl)titaniumdichloride, ethylene(2,3,5-trimethylcyclopentadienyl)(2',4',5'-trimethylcyclopentadienyl)titaniumdichloride, isopropylidenebis(2-methylindenyl)titaniumdichloride, isopropylidenebis(indenyl)titaniumdichloride, isopropylidenebis(2,4-dimethylindenyl)titaniumdichloride, isopropylidene(2,4-dimethylcyclopentadienyl)(3',5'-dimethylcyclopentadienyl)titaniumdichloride, isopropylidene(2-methyl-4-t-butylcyclopentadienyl)(3'-t-butyl-5'-methylcyclopentadienyl)titaniumdichloride, methylene(cyclopentadienyl)(3,4-dimethylcyclopentadienyl)titaniumdichloride, methylene(cyclopentadienyl)(3,4-dimethylcyclopentadienyl)titaniumchlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)(trimethylcyclopentadienyl)titaniumdichloride, methylene(cyclopentadienyl)(tetramethylcyclopentadienyl)titanium dichloride, isopropylidene(cyclopentadienyl)(3,4- dimethylcyclopentadienyl)titaniumdichloride, isopropylidene(cyclopentadienyl)(2,3,4,5-tetramethylcyclopentadienyl)titaniumdichloride, isopropylidene(cyclopentadienyl)(3-methylindenyl)titaniumdichloride, isopropylidene(cyclopentadienyl)(fluorenyl)titanium dichloride, isopropylidene(2-methylcyclopentadienyl)(fluorenyl)-titaniumdichloride, isopropylidene(2,5-dimethylcyclopentadienyl)(3,4-dimethylcyclopentadienyl)titaniumdichloride, isopropylidene(2,5-dimethylcyclopentadienyl)(fluorenyl)titaniumdichloride, ethylene(cyclopentadienyl)(3,5-dimethylcyclopentadienyl)titaniumdichloride, ethylene(cyclopentadienyl)(fluorenyl)titaniumdichloride, ethylene(2,5-dimethylcyclopentadienyl)(fluorenyl)titaniumdichloride, ethylene(2,5-diethylcyclopentadienyl)(fluorenyl)titaniumdichloride, diphenylmethylene(cyclopentadienyl)(3,4-diethylcyclopentadienyl)titaniumdichloride, diphenylmethylene(cyclopentadienyl)(3,4-diethylcyclopentadienyl)titaniumdichloride, cyclohexylidene(cyclopentadienyl)(fluorenyl)titaniumdichloride, cyclohexylidene(2,5-dimethylcyclopentadienyl)(3',4'-dimethylcyclopentadienyl)titaniumdichloride, methylenebis(indenyl)zirconiumdichloride, ethylenebis(indenyl)zirconiumdichloride, methylenebis(indenyl)zirconiumchlorohydride, ethylenebis(indenyl)methylzirconiumchloride, ethylenebis(indenyl)methoxychlorozirconium, ethylenebis(indenyl)zirconiumdiethoxide, ethylenebis(indenyl)dimethylzirconium, ethylenebis(4,5,6,7-tetrahydroindenyl)zirconium dichloride, ethylenebis(2-methylindenyl)zirconiumdichloride, ethylenebis(2,4-dimethylindenyl)zirconiumdichloride, ethylenebis(2-methyl-4-trimethylsilylindenyl)zirconiumdichloride, ethylenebis(2,4-dimethyl-5,6,7-trihydroindenyl)zirconiumdichloride, ethylene(2,4-dimethylcyclopentadienyl)(3',5'-dimethylcyclopentadienyl)zirconiumdichloride, ethylene(2-methyl-4-t-butylcyclopentadienyl)(3'-t-butyl-5'-methylcyclopentadienyl)zirconiumdichloride, ethylene(2,3,5-trimethylcyclopentadienyl)(2',4',5'-trimethylcyclopentadienyl)zirconiumdichloride, isopropylidenebis(2-methylindenyl)zirconiumdichloride, isopropylidenebis(indenyl)zirconiumdichloride, isopropylidenebis(2,4-dimethylindenyl)zirconium dichloride, isopropylidene(2,4-dimethylcyclopentadienyl)(3',5'-dimethylcyclopentadienyl)zirconiumdichloride, isopropylidene(2-methyl-4-t-butylcyclopentadienyl)(3'-t-butyl-5'-methylcyclopentadienyl)zirconiumdichloride, methylene(cyclopentadienyl)(3,4-dimethylcyclopentadienyl)zirconiumdichloride, methylene(cyclopentadienyl)(3,4-dimethylcyclopentadienyl)zirconiumchlorohydride, methylene(cyclopentadienyl)(3,4-dimethylcyclopentadienyl)dimethylzirconium, methylene(cyclopentadienyl)(3,4-dimethylcyclopentadienyl)diphenylzirconium, methylene(cyclopentadienyl)(trimethylcyclopentadienyl)zirconiumdichloride, methylene(cyclopentadienyl)(tetramethylcyclopentadienyl)zirconiumdichloride, isopropylidene(cyclopentadienyl)(3,4-dimethylcyclopentadienyl)zirconiumdichloride, isopropylidene(cyclopentadienyl)(2,3,4,5-tetramethylcyclopentadienyl)zirconiumdichloride, isopropylidene(cyclopentadienyl)(3-methylindenyl)zirconiumdichloride, isopropylidene(cyclopentadienyl)(fluorenyl)zirconiumdichloride, isopropylidene(2methylcyclopentadienyl)(fluorenyl)zirconiumdichloride, isopropylidene(2,5-dimethylcyclopentadienyl)(3,4-dimethylcyclopentadienyl)zirconiumdichloride, isopropylidene(2,5-dimethylcyclopentadienyl)(fluorenyl)zirconiumdichloride, ethylene(cyclopentadienyl)(3,5-dimethylcyclopentadienyl)zirconiumdichloride, ethylene(cyclopentadienyl)(fluorenyl)zirconiumdichloride, ethylene(2,5-dimethylcyclopentadienyl)(fluorenyl)zirconiumdichloride, ethylene(2,5-diethylcyclopentadienyl)(fluorenyl)zirconiumdichloride, diphenylmethylene(cyclopentadienyl)(3,4-diethylcyclopentadienyl)zirconiumdichloride, diphenylmethylene(cyclopentadienyl)(3,4-diethylcyclopentadienyl)zirconiumdichloride, cyclohexylidene(cyclopentadienyl)(fluorenyl)zirconiumdichloride, cyclohexylidene(2,5-dimethylcyclopentadienyl)-(3',4'-dimethylcyclopentadienyl)zirconiumdichloride, methylenebis(indenyl)hafniumdichloride, ethylenebis(indenyl)hafniumdichloride, methylenebis(indenyl)hafniumchlorohydride, ethylenebis(indenyl)methylhafniumchloride, ethylenebis(indenyl)methoxychlorohafnium, ethylenebis(indenyl)hafniumdiethoxide, ethylenebis(indenyl)dimethylhafnium, ethylenebis(4,5,6,7-tetrahydroindenyl)hafniumdichloride, ethylenebis(2-methylindenyl)hafniumdichloride, ethylenebis(2,4-dimethylindenyl)hafniumdichloride, ethylenebis(2-methyl-4-trimethylsilylindenyl)hafniumdichloride, ethylenebis(2,4-dimethyl-5,6,7-trihydroindenyl)hafniumdichloride, ethylene(2,4-dimethylcyclopentadienyl)(3',5'-dimethylcyclopentadienyl)hafniumdichloride, ethylene(2-methyl-4-t-butylcyclopentadienyl)(3'-t-butyl-5'-methylcyclopentadienyl)hafniumdichloride, ethylene(2,3,5-trimethylcyclopentadienyl)(2',4',5'-trimethylcyclopentadienyl)hafniumdichloride, isopropylidenebis(2-methylindenyl)hafniumdichloride, isopropylidenebis(indenyl)hafniumdichloride, isopropylidenebis(2,4-dimethylindenyl)hafniumdichloride, isopropylidene(2,4-dimethylcyclopentadienyl)(3',5'-dimethylcyclopentadienyl)hafniumdichloride, isopropylidene(2-methyl-4-t-butylcyclopentadienyl)(3'-t-butyl-5'-methylcyclopentadienyl)hafniumdichloride, methylene(cyclopentadienyl)(3,4-dimethylcyclopentadienyl)hafniumdichloride, methylene(cyclopentadienyl)(3,4-dimethylcyclopentadienyl)hafniumchlorohydride, methylene(cyclopentadienyl)(3,4-dimethylcyclopentadienyl)dimethylhafnium, methylene(cyclopentadienyl)(3,4-dimethylcyclopentadienyl)diphenylhafnium, methylene(cyclopentadienyl)(trimethylcyclopentadienyl)hafniumdichloride, methylene(cyclopentadienyl)(tetramethylcyclopentadienyl)-hafniumdichloride, isopropylidene(cyclopentadienyl)(3,4-dimethylcyclopentadienyl)hafniumdichloride, isopropylidene(cyclopentadienyl)(2,3,4,5- tetramethylcyclopentadienyl)hafniumdichloride, isopropylidene(cyclopentadienyl)(3-methylindenyl)hafniumdichloride, isopropylidene(cyclopentadienyl)(fluorenyl)hafniumdichloride, isopropylidene(2-methylcyclopentadienyl)(fluorenyl)hafniumdichloride, isopropylidene(2,5-dimethylcyclopentadienyl)(3,4-dimethylcyclopentadienyl)hafniumdichloride, isopropylidene(2,5-dimethylcyclopentadienyl)(fluorenyl)hafniumdichloride, ethylene(cyclopentadienyl)(3,5-dimethylcyclopentadienyl)hafniumdichloride, ethylene(cyclopentadienyl)(fluorenyl)hafniumdichloride, ethylene(2,5-dimethylcyclopentadienyl)(fluorenyl)hafniumdichloride, ethylene(2,5-diethylcyclopentadienyl)(fluorenyl)hafniumdichloride, diphenylmethylene(cyclopentadienyl)(3,4-diethylcyclopentadienyl)hafniumdichloride, diphenylmethylene(cyclopentadienyl)(3,4-diethylcyclopentadienyl)hafniumdichloride, cyclohexylidene(cyclopentadienyl)(fluorenyl)hafniumdichloride, cyclohexylidene(2,5-dimethylcyclopentadienyl)(3',4'-dimethylcyclopentadienyl)hafniumdichloride, etc.

(3) Transition metal compounds having two silylene-crosslinked, conjugated, 5-membered cyclic ligands, such as dimethylsilylenebis(indenyl)titaniumdichloride, dimethylsilylenebis(4,5,6,7-tetrahydroindenyl)titaniumdichloride, dimethylsilylenebis(2-methylindenyl)titaniumdichloride, dimethylsilylenebis(2,4-dimethylindenyl)titaniumdichloride, dimethylsilylenebis(2,4-dimethylcyclopentadienyl)(3',4'-dimethylcyclopentadienyl)titaniumdichloride, dimethylsilylenebis(2-methyl-4,5-benzindenyl)titaniumdichloride, dimethylsilylenebis(2-methyl-4-naphtylindenyl)titaniumdichloride, dimethylsilylenebis(2-methyl-4-phenylindenyl)titaniumdichloride, phenylmethylsilylenebis(indenyl)titaniumdichloride, phenylmethylsilylenebis(4,5,6,7-tetrahydroindenyl)titaniumdichloride, phenylmethylsilylenebis(2,4-dimethylindenyl)titaniumdichloride, phenylmethylsilylene(2,4-dimethylcyclopentadienyl)(3',5'-dimethylcyclopentadienyl)titaniumdichloride, phenylmethylsilylene(2,3,5-trimethylcyclopentadienyl)(2',4',5'-trimethylcyclopentadienyl)titaniumdichloride, phenylmethylsilylenebis(tetramethylcyclopentadienyl)titaniumdichloride, diphenylsilylenebis(2,4-dimethylindenyl)titaniumdichloride, diphenylsilylenebis(indenyl)titaniumdichloride, diphenylsilylenebis(2-methylindenyl)titaniumdichloride, tetramethyldisilylenebis(indenyl)titaniumdichloride, tetramethyldisilylenebis(cyclopentadienyl)titaniumdichloride, tetramethyldisilylene(3-methylcyclopentadienyl)(indenyl)titaniumdichloride, dimethylsilylene(cyclopentadienyl)(3,4-dimethylcyclopentadienyl)titaniumdichloride, dimethylsilylene(cyclopentadienyl)(trimethylcyclopentadienyl)titaniumdichloride, dimethylsilylene(cyclopentadienyl)(tetramethylcyclopentadienyl)titaniumdichloride, dimethylsilylene(cyclopentadienyl)(3,4-diethylcyclopentadienyl)titaniumdichloride, dimethylsilylene(cyclopentadienyl)(triethylcyclopentadienyl)titaniumdichloride, dimethylsilylene(cyclopentadienyl)(tetraethylcyclopentadienyl)titaniumdichloride, dimethylsilylene(cyclopentadienyl)(fluorenyl)titaniumdichloride, dimethylsilylene(cyclopentadienyl)(2,7-di-t-butylfluorenyl)titaniumdichloride, dimethylsilylene(cyclopentadienyl)(octahydrofluorenyl)titaniumdichloride, dimethylsilylene(2-methylcyclopentadienyl)(fluorenyl)titaniumdichloride, dimethylsilylene(2,5-dimethylcyclopentadienyl)(fluorenyl)titaniumdichloride, dimethylsilylene(2-ethylcyclopentadienyl)(fluorenyl)titaniumdichloride, dimethylsilylene(2,5-diethylcyclopentadienyl)(fluorenyl)titaniumdichloride, diethylsilylene(2-methylcyclopentadienyl)(2',7'-di-t-butylfluorenyl)titaniumdichloride, dimethylsilylene(2,5-dimethylcyclopentadienyl)(2',7'-di-t-butylfluorenyl)titaniumdichloride, dimethylsilylene(2-ethylcyclopentadienyl)-(2',7'-di-t-butylfluorenyl)titanium-dichloride, dimethylsilylene(diethylcyclopentadienyl)(2,7-di-t-butylfluorenyl)titaniumdichloride, dimethylsilylene(methylcyclopentadienyl)(octahydrofluorenyl)titaniumdichloride, dimethylsilylene(dimethylcyclopentadienyl)(octahydrofluorenyl)titanium dichloride, dimethylsilylene(ethylcyclopentadienyl)(octahydrofluorenyl)titaniumdichloride, dimethylsilylene(diethylcyclopentadienyl)(octahydrofluorenyl)titaniumdichloride, dimethylsilylenebis(indenyl)zirconiumdichloride, dimethylsilylenebis(4,5,6,7-tetrahydroindenyl)zirconiumdichloride, dimethylsilylenebis(2-methylindenyl)zirconiumdichloride, dimethylsilylenebis(2,4-dimethylindenyl)zirconiumdichloride, dimethylsilylenebis(2,4-dimethylcyclopentadienyl)(3',5'-dimethylcyclopentadienyl)zirconiumdichloride, dimethylsilylenebis(2-methyl-4,5-benzindenyl)zirconiumdichloride, dimethylsilylenebis(2-methyl-4-naphtylindenyl)zirconiumdichloride, dimethylsilylenebis(2-methyl-4-phenylindenyl)zirconiumdichloride, phenylmethylsilylenebis(indenyl)zirconiumdichloride, phenylmethylsilylenebis(4,5,6,7-tetrahydroindenyl)zirconiumdichloride, phenylmethylsilylenebis(2,4-dimethylindenyl)zirconiumdichloride, phenylmethylsilylenebis(2,4-dimethylcyclopentadienyl)(3',5'-dimethylcyclopentadienyl)zirconiumdichloride, phenylmethylsilylene(2,3,5-trimethylcyclopentadienyl)(2',4',5'-trimethylcyclopentadienyl)zirconiumdichloride, phenylmethylsilylenebis(tetramethylcyclopentadienyl)zirconiumdichloride, diphenylsilylenebis(2,4-dimethylindenyl)zirconiumdichloride, diphenylsilylenebis(indenyl)zirconiumdichloride, diphenylsilylenebis(2-methylindenyl)zirconiumdichloride, tetramethyldisilylenebis(indenyl)zirconiumdichloride, tetramethyldisilylenebis(cyclopentadienyl)zirconiumdichloride, tetramethyldisilylene(3-methylcyclopentadienyl)(indenyl)zirconiumdichloride, dimethylsilylene(cyclopentadienyl)(3,4-dimethylcyclopentadienyl)zirconiumdichloride, dimethylsilylene(cyclopentadienyl)(trimethylcyclopentadienyl)zirconiumdichloride, dimethylsilylene(cyclopentadienyl)(tetramethylcyclopentadienyl)zirconiumdichloride, dimethylsilylene(cyclopentadienyl)(3,4-diethylcyclopentadienyl)zirconiumdichloride, dimethylsilylene(cyclopentadienyl)(triethylcyclopentadienyl)

zirconiumdichloride, dimethylsilylene(cyclopentadienyl)(tetraethylcyclopentadienyl)zirconiumdichloride, dimethylsilylene(cyclopentadienyl)(fluorenyl)zirconiumdichloride, dimethylsilylene(cyclopentadienyl)(2,7-di-t-butylfluorenyl)zirconiumdichloride, dimethylsilylene(cyclopentadienyl)(octahydrofluorenyl)zirconiumdichloride, dimethylsilylene(2-methylcyclopentadienyl)(fluorenyl)zirconiumdichloride, dimethylsilylene(2,5-dimethylcyclopentadienyl)(fluorenyl)zirconiumdichloride, dimethylsilylene(2-ethylcyclopentadienyl)(fluorenyl)zirconiumdichloride, dimethylsilylene(2,5-diethylcyclopentadienyl)(fluorenyl)zirconiumdichloride, diethylsilylene(2-methylcyclopentadienyl)(2',7'-di-t-butylfluorenyl)zirconiumdichloride, dimethylsilylene(2,5-dimethylcyclopentadienyl)(2',7'-di-t-butylfluorenyl)zirconiumdichloride, dimethylsilylene(2-ethylcyclopentadienyl)(2',7'-di-t-butylfluorenyl)zirconiumdichloride, dimethylsilylene(diethylcyclopentadienyl)(2',7'-di-t-butylfluorenyl)zirconiumdichloride, dimethylsilylene(methylcyclopentadienyl)(octahydrofluorenyl)zirconiumdichloride, dimethylsilylene(dimethylcyclopentadienyl)(octahydrofluorenyl)zirconiumdichloride, dimethylsilylene(ethylcyclopentadienyl)(octahydrofluorenyl)zirconiumdichloride, dimethylsilylene(diethylcyclopentadienyl)(octahydrofluorenyl)zirconiumdichloride, dimethylsilylenebis(indenyl)hafniumdichloride, dimethylsilylenebis(4,5,6,7-tetrahydroindenyl)hafniumdichloride, dimethylsilylenebis(2-methylindenyl)hafniumdichloride, dimethylsilylenebis(2,4-dimethylindenyl)hafniumdichloride, dimethylsilylenebis(2,4-dimethylcyclopentadienyl)(3',5'-dimethylcyclopentadienyl)hafniumdichloride, dimethylsilylenebis(2-methyl-4,5-benzindenyl)hafniumdichloride, dimethylsilylenebis(2-methyl-4-naphtylindenyl)hafniumdichloride, dimethylsilylenebis(2-methyl-4-phenylindenyl)hafniumdichloride, phenylmethylsilylenebis(indenyl)hafniumdichloride, phenylmethylsilylenebis(4,5,6,7-tetrahydroindenyl)hafniumdichloride, phenylmethylsilylenebis(2,4-dimethylindenyl)hafniumdichloride, phenylmethylsilylene(2,4-dimethylcyclopentadienyl)(3',5'-dimethylcyclopentadienyl)hafniumdichloride, phenylmethylsilylene(2,3,5-trimethylcyclopentadienyl)(2',4',5'-trimethylcyclopentadienyl)hafniumdichloride, phenylmethylsilylenebis(tetramethylcyclopentadienyl)hafniumdichloride, diphenylsilylenebis(2,4-dimethylindenyl)hafniumdichloride, diphenylsilylenebis(indenyl)hafniumdichloride, diphenylsilylenebis(2-methylindenyl)hafniumdichloride, tetramethyldisilylenebis(indenyl)hafniumdichloride, tetramethyldisilylenebis(cyclopentadienyl)hafniumdichloride, tetramethyldisilylene(3-methylcyclopentadienyl)(indenyl)hafniumdichloride, dimethylsilylene(cyclopentadienyl)(3,4-dimethylcyclopentadienyl)hafniumdichloride, dimethylsilylene(cyclopentadienyl)(trimethylcyclopentadienyl)hafniumdichloride, dimethylsilylene(cyclopentadienyl)(tetramethylcyclopentadienyl)hafniumdichloride, dimethylsilylene(cyclopentadienyl)(3,4-diethylcyclopentadienyl)hafniumdichloride, dimethylsilylene(cyclopentadienyl)(triethylcyclopentadienyl)hafniumdichloride, dimethylsilylene(cyclopentadienyl)(tetraethylcyclopentadienyl)hafniumdichloride, dimethylsilylene(cyclopentadienyl)(fluorenyl)hafniumdichloride, dimethylsilylene(cyclopentadienyl)(2,7-di-t-butylfluorenyl)hafniumdichloride, dimethylsilylene(cyclopentadienyl)(octahydrofluorenyl)hafniumdichloride, dimethylsilylene(2-methylcyclopentadienyl)(fluorenyl)hafniumdichloride, dimethylsilylene(2,5-dimethylcyclopentadienyl)(fluorenyl)hafniumdichloride, dimethylsilylene(2-ethylcyclopentadienyl)(fluorenyl)hafniumdichloride, dimethylsilylene(2,5-diethylcyclopentadienyl)(fluorenyl)hafniumdichloride, diethylsilylene(2-methylcyclopentadienyl)(2',7'-di-t-butylfluorenyl)hafniumdichloride, dimethylsilylene(2,5-dimethylcyclopentadienyl)(2',7'-di-t-butylfluorenyl)hafniumdichloride, dimethylsilylene(2-ethylcyclopentadienyl)(2',7'-di-t-butylfluorenyl)hafniumdichloride, dimethylsilylene(diethylcyclopentadienyl)(2,7-di-t-butylfluorenyl)hafniumdichloride, dimethylsilylene(methylcyclopentadienyl)(octahydrofluorenyl)hafniumdichloride, dimethylsilylene(dimethylcyclopentadienyl)(octahydrofluorenyl)hafniumdichloride, dimethylsilylene(ethylcyclopentadienyl)(octahydrofluorenyl)hafniumdichloride, dimethylsilylene(diethylcyclopentadienyl)(octahydrofluorenyl)hafniumdichloride, etc.

(4) Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl)titaniumdichloride, dimethylgermylene(cyclopentadienyl)(fluorenyl)titaniumdichloride, methylalumylenebis(indenyl)titaniumdichloride, phenylalumylenebis(indenyl)titaniumdichloride, phenylphosphylenebis(indenyl)titaniumdichloride, ethylborylenebis(indenyl)titaniumdichloride, phenylaminylenebis(indenyl)titaniumdichloride, phenylalumylene(cyclopentadienyl)(fluorenyl)titaniumdichloride, dimethylgermylenebis(indenyl)zirconiumdichloride, dimethylgermylene(cyclopentadienyl)(fluorenyl)zirconiumdichloride, methylalumylenebis(indenyl)zirconiumdichloride, phenylaminylenebis(indenyl)zirconium dichloride, phenylphosphylenebis(indenyl)zirconiumdichloride, ethylborylenebis(indenyl)zirconiumdichloride, phenylaminylenebis(indenyl)zirconiumdichloride, phenylaminylene(cyclopentadienyl)(fluorenyl)zirconiumdichloride, dimethylgermylenebis(indenyl)hafnium dichloride, dimethylgermylene(cyclopentadienyl)(fluorenyl)hafniumdichloride, methylalumylenebis(indenyl)hafniumdichloride, phenylaminylenebis(indenyl)hafniumdichloride, phenylphosphylenebis(indenyl)hafniumdichloride, ethylborylenebis(indenyl)hafniumdichloride, phenylaminylenebis(indenyl)hafniumdichloride, phenylaminylene(cyclopentadienyl)(fluorenyl)hafniumdichloride, etc.

(5) Transition metal compounds having one conjugated, 5-membered cyclic ligand, such as pentamethylcyclopentadienyl(diphenylamino) titaniumdichloride, indenyl(diphenylamino) titaniumdichloride, pentamethylcyclopentadienylbis (trimethylsilyl)aminotitaniumdichloride, pentamethylcyclopentadienylphenoxytitaniumdichloride, dimethylsilylene(tetramethylcyclopentadienyl)-t-butylaminotitaniumdichloride, dimethylsilylene (tetramethylcyclopentadienyl) phenylaminotitaniumdichloride, dimethylsilylene (tetrahydroindenyl)decylaminotitaniumdichloride, dimethylsilylene(tetrahydroindenyl)[bis(trimethylsilyl) amino]titaniumdichloride, dimethylgermylene (tetramethylcyclopentadienyl) phenylaminotitaniumdichloride, pentamethylcyclopentadienyltitaniumtrimethoxide, pentamethylcyclopentadienyltitaniumtrichloride, pentamethylcyclopentadienyl-bis(phenyl) aminozirconiumdichloride, indenyl-bis(phenyl) aminozirconiumdichloride, pentamethylcyclopentadienylbis(trimethylsilyl) aminozirconiumdichloride, pentamethylcyclopentadienylphenoxyzirconiumdichloride, dimethylsilylene(tetramethylcyclopentadienyl)-t-butylaminozirconiumdichloride, dimethylsilylene (tetramethylcyclopentadienyl) phenylaminozirconiumdichloride, dimethylsilylene (tetrahydroindenyl)decylaminozirconiumdichloride, dimethylsilylene(tetrahydroindenyl)[bis(trimethylsilyl) amino]zirconiumdichloride, dimethylgermylene (tetramethylcyclopentadienyl) phenylaminozirconiumdichloride, pentamethylcyclopentadienylzirconiumtrimethoxide, pentamethylcyclopentadienylzirconiumtrichloride, pentamethylcyclopentadienyl-bis(phenyl) aminohafniumdichloride, indenyl-bis(phenyl) aminohafniumdichloride, pentamethylcyclopentadienylbis(trimethylsilyl) aminohafniumdichloride, pentamethylcyclopentadienylphenoxyhafniumdichloride, dimethylsilylene(tetramethylcyclopentadienyl)-t-butylaminohafniumdichloride, dimethylsilylene (tetramethylcyclopentadienyl)phenylaminohafnium dichloride, dimethylsilylene(tetrahydroindenyl) decylaminohafniumdichloride, dimethylsilylene (tetrahydroindenyl)[bis(trimethylsilyl)amino] hafniumdichloride, dimethylgermylene (tetramethylcyclopentadienyl) phenylaminohafniumdichloride, pentamethylcyclopentadienylhafniumtrimethoxide, pentamethylcyclopentadienylhafnium trichloride, etc.

(6) Transition metal compounds having two conjugated, 5-membered cyclic ligands in which the ligands are double-crosslinked, such as (1,1'-dimethylsilylene)(2, 2'-isopropylidene)-bis(cyclopentadienyl) titaniumdichloride, (1,1'-dimethylsilylene)(2,2'-dimethylsilylene)bis(cyclopentadienyl) titaniumdichloride, (1,1'-dimethylsilylene)(2,2'-isopropylidene)bis(cyclopentadienyl) dimethyltitanium, (1,1'-dimethylsilylene)(2,2'-isopropylidene)bis(cyclopentadienyl)dibenzyltitanium, (1,1'-dimethylsilylene)(2,2'-isopropylidene)bis (cyclopentadienyl)bis(trimethylsilyl)titanium, (1,1'-dimethylsilylene)(2,2'-isopropylidene)bis (cyclopentadienyl)bis(trimethylsilylmethyl)titanium, (1,2'-dimethylsilylene)(2,1'-ethylene)bis(indenyl) titaniumdichloride, (1,1'-dimethylsilylene)(2,2'-ethylene)bis(indenyl)titaniumdichloride, (1,1'-ethylene)(2,2'-dimethylsilylene)-bis(indenyl)titanium dichloride, (1,1'-dimethylsilylene)(2,2'-cyclohexylidene)bis(indenyl)titaniumdichloride, (1,1'-dimethylsilylene)(2,2'-isopropylidene)bis (cyclopentadienyl)zirconiumdichloride, (1,1'-dimethylsilylene)(2,2'-dimethylsilylene)bis (cyclopentadienyl)zirconiumdichloride, (1,1'-dimethylsilylene)(2,2'-isopropylidene)bis (cyclopentadienyl)dimethylzirconium, (1,1'-dimethylsilylene)(2,2'-isopropylidene)bis (cyclopentadienyl)dibenzylzirconium, (1,1'-dimethylsilylene)(2,2'-isopropylidene)bis (cyclopentadienyl)bis(trimethylsilyl)zirconium, (1,1'-dimethylsilylene)(2,2'-isopropylidene)bis (cyclopentadienyl)bis(trimethylsilylmethyl)zirconium, (1,2'-dimethylsilylene)(2,1'-ethylene)bis(indenyl) zirconiumdichloride, (1,1'-dimethylsilylene)(2,2'-ethylene)bis(indenyl)zirconiumdichloride, (1,1'-ethylene)(2,2'-dimethylsilylene)-bis(indenyl) zirconiumdichloride, (1,1'-dimethylsilylene)(2,2'-cyclohexylidene)bis(indenyl)zirconiumdichloride, (1,1'-dimethylsilylene)(2,2'-isopropylidene)bis (cyclopentadienyl)hafnium dichloride, (1,1'-dimethylsilylene)(2,2'-dimethylsilylene)bis (cyclopentadienyl)hafniumdichloride, (1,1'-dimethylsilylene)(2,2'-isopropylidene)bis (cyclopentadienyl)dimethylhafnium, (1,1'-dimethylsilylene)(2,2'-isopropylidene)bis (cyclopentadienyl)dibenzylhafnium, (1,1'-dimethylsilylene)(2,2'-isopropylidene)bis (cyclopentadienyl)bis(trimethylsilyl)hafnium, (1,1'-dimethylsilylene)(2,2'-isopropylidene)bis (cyclopentadienyl)bis(trimethylsilylmethyl)hafnium, (1,2'-dimethylsilylene)(2,1'-ethylene)bis(indenyl) hafnium-dichloride, (1,1'-dimethylsilylene)(2,2'-ethylene)-bis(indenyl)hafniumdichloride, (1,1'-ethylene)(2,2'-dimethylsilylene)bis(indenyl) hafniumdichloride, (1,1'-dimethylsilylene)(2,2'-cyclohexylidene)bis(indenyl)hafniumdichloride, etc.

(7) Derivatives from compounds of (1) to (6) noted above, which are produced by substituting the chlorine atoms in those compounds of (1) to (6) with any of a bromine atom, an iodine atom, a hydrogen atom, a methyl group, a phenyl group, a benzyl group, a methoxy group, a dimethylamino group and the like.

(8) Of the compounds of (1) to (7), the transition metal compounds having one conjugated, 5-membered cyclic ligand of (5) are especially preferably employed in producing styrenic polymers.

(II) As specific examples of the transition metal compounds of formula (II-5), mentioned are the following compounds.

Tetra-n-butoxytitanium, tetra-i-propoxytitanium, tetraphenoxytitanium, tetracresoxytitanium, tetrachlorotitanium, tetrakis(diethylamino)titanium, tetrabromotitanium, as well as their derivatives as produced by substituting the titanium atom in those compounds with zirconium or hafnium. Of those transition metal compounds, preferred are alkoxytitanium compounds, alkoxyzirconium compounds, and alkoxyhafnium compounds.

(III) In the transition metal compounds of formula (II-6), $M^2$ represents a transition metal of Groups 8 to 10 of the Periodic Table. Concretely, it includes iron, cobalt, nickel, palladium, platinum, etc. Of those, preferred are nickel, palladium and iron. $L^1$ and $L^2$ each represent a coordination-bonding ligand bonding to the transition metal via a nitrogen or phosphorus atom therebetween; and $X^2$ and $Y^2$ each represent a covalent-bonding or ionic-bonding ligand. As mentioned hereinabove, $X^2$ and $Y^2$ include, for example, a hydrogen atom, a halogen atom, a hydrocarbon atom having from 1 to 20, preferably from 1 to 10 carbon atoms, an alkoxy group having from 1 to 20, preferably from 1 to 10 carbon atoms, an imino group, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^2$ and $Y^2$ may be the same or different ones. Specific examples of $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, quinoline, N-methylpyrrolidine, bistrimethylsilylaminobistrimethylsilyliminophosphorane, etc. $L^1$, $L^2$, $X^2$ and $Y^2$ may be bonded to each other to form a cyclic structure.

Specific examples of the transition metal compounds of formula (II-6) include dibromobistriphenylphosphine nickel, dichlorotriphenylphosphinenickel, dibromodiacetonitrilenickel, dibromodibenzonitrilenickel, dibromo(1,2-bisdiphenylphosphinoethane)nickel, dibromo (1,3-bisdiphenylphosphinopropane)nickel, dibromo(1,1'-diphenylbisphosphinoferrocene)nickel, dimethylbistriphenylphosphinenickel, dimethyl(1,2-bisdiphenylphosphinoethane)nickel, methyl(1,2bisdiphenylphosphinoethano)nickeltetrafluoroborate, (2-diphenylphosphino-1-phenylethyleneoxy) phenylpyridinenickel, dichlorobistriphenylphosphinepalladium, dichlorodibenzonitrilepalladium, dichlorodiacetonitrilepalladium, dichloro(1,2-bisdiphenylphosphinoethane)palladium, bistriphenylphosphinopalladiumbistetrafluoroborate, bis(2,2'-bipyridino)methyliron tetrafluoroborateetherate, as well as the following compounds.

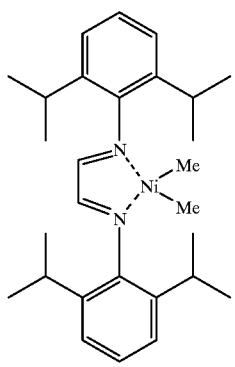

-continued

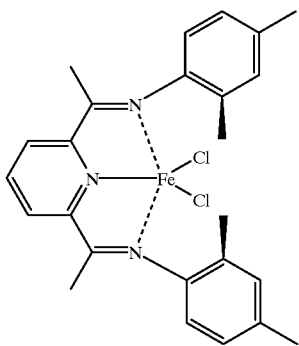

wherein Me indicates a methyl group.

Of those, preferred are cationic complexes such as methyl (1,2-bisdiphenylphosphinoethano)nickel tetrafluoroborate, bistriphenylphosphinopalladium bistetrafluoroborate, and bis(2,2'-bipyridino)methyliron tetrafluoroborate etherate, as well as the compounds represented hereinabove by their structural formulae.

As the component (a) in the catalyst of the invention, one or more transition metal compounds noted above may be used either singly or as combined.

(b) Water-swellable Clay:

Water-swellable clay which is used as the starting material in preparing the catalyst of the invention includes clay, clay minerals and ion-exchanging layered compounds of the following (1) to (4), and they are capable of absorbing a large amount of water to swell. Depending on their swelling degree which is the index of their swellability and which is obtained by dividing the maximum amount of water that a dry sample of them has absorbed to swell by the mass of the sample, suitable ones may be selected from them for use herein.

(1) Clay and Clay Minerals:

Clay or clay minerals may be used as the component (b) Clay is an aggregate of fine hydrous silicate minerals. It is plastic when kneaded with a suitable amount of water, and is rigid when dried. When baked at high temperatures, it is sintered. Clay minerals are hydrous silicates which are the essential components constituting clay.

These are not limited to only natural ones, but synthetic products of those substances ate employable herein.

(2) Ion-exchanging Layered Compounds:

As the component (b), also usable are ion-exchanging layered compounds, which are characterized by the crystal structure of such that a plurality of crystal planes formed through ionic bonding or the like are laminated in parallel layers via weak bonding force between the adjacent layers, and in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of the smectite family; illite and sericite of the mica family; and mixed layer minerals of smectites and micas, or those of micas and vermiculites.

As synthetic products, known are fluoro-tetrasilicon mica, laponite, smectone, etc.

Also mentioned are ion-exchanging compounds having a layered crystal structure, such as $\alpha$-Zr(HPO$_4$)$_2$, $\gamma$-Zr (HPO$_4$)$_2$, $\alpha$-Ti(HPO$_4$)$_2$, $\gamma$-Ti(HPO$_4$)$_2$, etc. These are not clay minerals.

Examples of clay and clay minerals which do not belong to ion-exchanging layered compounds and which are usable as the component (b) include clay having a low montmorillonite content and referred to as bentonite; kibushi clay comprising montmorillonite and many other components; gairome clay; sepiolite and palygorskite having a fibrous morphology; and amorphous or low-crystalline allophane, imogolite, etc.

The component (b) is contacted with the component (c), a silane compound, and optionally with the component (d), an organic metal compound with a metal of Groups 1, 2, 13 and 14 of the Periodic Table, and it is desirable that clay, clay minerals and ion-exchanging layered compounds for the component (b) are chemically treated for the purpose of removing impurities from them or for modifying their structures and functions.

The chemical treatment referred to herein indicates both the surface treatment to remove impurities from surfaces and the treatment to modify the crystal structure of clay. Concretely, it includes acid treatment, alkali treatment, salt treatment, organic treatment, etc.

The acid treatment is to remove impurities from surfaces, while releasing cations such as aluminium, iron, magnesium and the like from crystal structures to thereby enlarge surface areas. The alkali treatment is to destroy the crystal structure of clay, thereby modifying the structure of clay. The salt treatment and the organic treatment are to form ionic complexes, molecular complexes, organic complexes, etc., whereby surface areas and layer-to-layer spaces may be changed. Owing to their ion-exchanging ability, the interlayer exchangeable ions in the compounds may be exchanged with any other bulky ions to give layered substances having enlarged interlayer spaces.

(3) The substances of the component (b) noted above may be directly used as they are, or, if desired, additional water may be adsorbed onto them, or they may be heated and dehydrated prior to being used.

(4) As the component (b), preferred are clay and clay minerals. Most preferred are phyllosilicic acid compounds, of which smectite is desirable, and montmorillonite is more desirable. Alkali metal salts and alkaline earth metal salts of montmorillonite are favorably used in the invention, and they have a swelling degree of at least 20 (ml/2 g), generally falling between 30 and 50 (ml/2 g).

(c) Silane Compounds:

As comprising a silane compound, the catalyst of the invention has higher activity. As the silane compounds for the component (c), preferred are those of formula (II-1) mentioned hereinabove, and more preferred are those of formula (II-2) also mentioned hereinabove.

Silane compounds of formula (II-1) include bis-silyl compounds, $X_{4-n}Si(CH_2)_mSiX_{4-n}$ (where m is from 1 to 10; and n is 1, 2 or 3) having plural Si's in the molecule, and also poly-nuclear polysiloxanes, polysilazanes, etc. The substituent R in formulae (II-1) and (II-2) includes an alkyl group, a phenyl group, a silyl group, and a hydride group, and is preferably an alkyl group. The substituent X therein includes a halide, a hydroxide, an alkoxide and an amide, and is preferably a halide.

Specific examples of the silane compounds include trialkylsilylchlorides such as trimethylsilylchloride, triethylsilylchloride, triisopropylsilylchloride, t-butyldimethylsilylchloride, t-butyldiphenylsilylchloride, phenethyldimethylsilylchloride, etc.; dialkylsilyldichlorides such as dimethylsilyldichloride, diethylsilyldichloride, diisopropylsilyldichloride, di-n-hexylsilyldichloride, dicyclohexylsilyldichloride, docosylmethylsilyldichloride, bis(phenethyl)silyldichloride, methylphenethylsilyldichloride, diphenylsilyldichloride, dimethylsilyldichloride, ditolylsilyldichloride, etc.; alkylsilyltrichlorides such as methylsilyltrichloride, ethylsilyltrichloride, isopropylsilyltrichloride, dodecylsilyltrichloride, phenylsilyltrichloride, mesitylsilyltrichloride, tolylsilyltrichloride, phenethylsilyltrichloride, etc.; other halides to be derived from the compounds noted above by substituting the chloride moiety with any other halogens; disilazanes such as bis(trimethylsilyl)amide, bis(triethylsilyl)amide, bis(triisopropylsilyl)amide, bis(dimethylethylsilyl)amide, bis(diethylmethylsilyl)amide, bis(dimethylphenylsilyl)amide, bis(dimethyltolylsilyl)amide, bis(dimethylmesitylsilyl)amide, etc.; trialkylsilylhydroxides such as trimethylsilylhydroxide, triethylsilylhydroxide, triisopropylsilylhydroxide, tert-butyldimethylsilylhydroxide, phenethyldimethylsilylhydroxide, etc.; polysilanols generally referred to as peralkylpolysiloxypolyols; bissilyls such as bis(methyldichlorosilyl)methane, 1,2-bis(methyldichlorosilyl)ethane, bis(methyldichlorosilyl)octane, bis(triethoxysilyl)ethane, etc.; and silane hydrides such as dimethylchlorosilane, (N,N-dimethylamino)dimethylsilane, diisobutylchlorosilane, etc. Of the silane compounds of the formula noted above, preferred are those where n is an integer of from 1 to 3. One of the silane compounds may be used as the component (c). As the case may be, however, two or more of the silane compounds may be used, as combined in any desired manner. (d) Organic metal compounds with a metal of Group 1, 2, 13 or 14 of the Periodic Table:

In the invention, optionally used is an organic metal compound with a metal of Group 1, 2, 13 or 14 of the Periodic Table, as the component (d) for the catalyst. Known are various types of organic metal compounds with a metal of Group 1, 2, 13 or 14 of the Periodic Table. For example, preferably employed herein are alkyl-having aluminium compounds of a general formula (II-7):

$$R^9{}_m Al(OR^{10})_n X_{3-m-n} \tag{II-7}$$

wherein $R^9$ and $R^{10}$ each represent an alkyl group having from 1 to 8, preferably from 1 to 4 carbon atoms; X represents a hydrogen atom or a halogen atom; $0<m\leq 3$; and $0\leq n<3$.

In formula (II-7), m is preferably 2 or 3, and most preferably 3. In the same, n is preferably 0 or 1.

Also preferred are alkyl-having magnesium compounds of a general formula (II-8):

$$R^9{}_2 Mg \tag{II-8}$$

wherein $R^9$ has the same meaning as in formula (II-7), and alkyl-having zinc compounds of a general formula (II-9):

$$R^9{}_2 Zn \tag{II-9}$$

wherein $R^9$ has the same meaning as in formula (II-7).

Specific examples of the organic metal compounds with a metal of Group 1, 2, 13 or 14 of the Periodic Table include trialkylaluminiums such as trimethylaluminium, triethylaluminium, tri-n-propylaluminium, triisopropylaluminium, tri-n-butylaluminium, triisobutylaluminium, tri-t-butylaluminium, etc.; dialkylaluminium halides such as dimethylaluminiumchloride, diethylaluminiumchloride, di-n-propylaluminiumchloride, diisopropylaluminiumchloride, di-n-butylaluminiumchloride, diisobutylaluminiumchloride, di-t- butylaluminiumchloride, etc.; dialkylaluminium alkoxides such as dimethylaluminiummethoxide, dimethylaluminiummethoxide, etc.; dialkylaluminium hydrides such as dimethylaluminium hydride, diethylaluminiumhydride, diisobutylaluminium hydride, etc. They further include dialkylmagnesiums such as dimethylmagnesium, diethylmagnesium, di-n-propylmagnesium, diisopropylmagnesium, dibutylmagnesium, butylethylmagnesium, etc.; and dialkylzincs such as dimethylzinc, diethylzinc, ethyl-n-propylzinc, diisopropylzinc, etc. Of those compounds, preferred are trialkylaluminiums and dialkylaluminium monohalides.

As the component (d), further usable are linear alumoxanes of the following general formula (II-10), cyclic alumoxanes of the following general formula (II-11), and their mixtures.

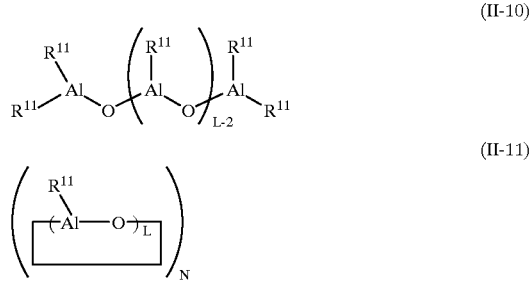

(II-10)

(II-11)

wherein $R^{11}$ represents an alkyl group having from 1 to 20 carbon atoms, and plural $R^{11}$'s may be the same or different; L represents an integer of from 2 to 40; and N represents an integer of from 1 to 50.

In formulae (II-10) and (II-11), the alkyl group having from 1 to 20 carbon atoms for $R^{11}$ is preferably one having from 1 to 8 carbon atoms. More preferred are a methyl group, an ethyl group, an n-propyl group, an i-propyl group, and all types of butyl groups. In those, L preferably falls between 2 and 30. Examples of those alumoxanes are methylalumoxane, ethylalumoxane, isobutylalumoxane, etc.

The component (d) may be contacted with the other constituent components to prepare the catalyst of the invention. For example, the component (d) may be previously contacted with any of the transition metal compound for the component (a) and the silane compound-processed clay for the component (b) before the components (a) and (b) are mixed to prepare the catalyst. Pre-treating the components (a) and (b) with the component (d) improves the activity of the intended catalyst for olefin polymerization. Alternatively, after the components (a) and (b) are contacted with each other, the resulting mixture may be further contacted with the component (d).

If desired, the component (d) may be added to the system of olefin polymerization in which is used the catalyst having been or not having been contacted with the component (d). In that manner, the catalyst being present in the polymerization system may be contacted with the component (d) in situ in the polymerization system. Adding the component (d) to the polymerization system is favorable, as the component (d) attenuates the action of impurities that may exist in the polymerization system and may have some negative influences on the olefin polymerization.

2. Method for Preparing Catalyst:

For preparing the catalyst for olefin polymerization of the invention, the constituent components noted above may be contacted with each other, for example, according to the method mentioned below. In the method, it is desirable that the steps after the treatment of water-swellable clay with a silane compound are all effected in an inert gas atmosphere.

First, water-swellable clay for the component (b) is added to water of which the amount is enough to prepare aqueous clay colloid, preferably at least 40 times by weight the clay to prepare aqueous clay colloid.

Next, a silane compound for the component (c) is added to the resulting aqueous clay colloid, and stirred under heat, by which the clay is treated with the silane compound. The temperature for the treatment may fall between −30 and 100° C. In order to shorten the time for catalyst preparation, it is desirable that the temperature for the treatment is 100° C. or so. Though varying depending on the type of the water-swellable clay to be treated and on the temperature for the treatment, the treatment time may fall between 30 minutes and 10 hours.

The amount of the silane compound to be used herein for the component (c) may fall between 0.001 and 1000 mols, preferably between 0.01 and 100 mols in terms of the silicon atom, relative to one kg of the component (b), water-swellable clay to be treated therewith. If the amount of the silane compound used is smaller than 0.001 mols, the polymerization activity of the catalyst to be produced will be low; and if larger than 1000 mols, the activity will also be low.

Through the treatment with a silane compound, the aqueous clay colloid changes into a suspension of clay slurry. The resulting clay slurry is again washed with water, and then filtered. The residue is dried to be a dry solid.

To the resulting silane compound-processed clay, optionally added is the component (d). The amount of the component (d) may fall between 0.1 and 1000 mols, preferably between 1 and 100 mols in terms of the constituent metal atom in the component (d), relative to one kg of the silane compound-processed clay. If its amount is smaller than 0.1 mols, the component (d) added could not satisfactorily exhibit its effect to improve the polymerization activity of the catalyst produced; but even if larger than 1000 mols, the effect of the component (d) added could not be augmented any more. For the treatment of contacting the silane compound-processed clay with the component (d), preferably employed is a method of suspending or dissolving the two components in an organic solvent such as, for example, pentane, hexane, heptane, toluene, xylene or the like, in which the two are mixed.

Next, the silane compound-processed clay having been prepared in the manner noted above is contacted with a transition metal compound for the component (a). For this, it is desirable that the amount of the transition metal compound to be used falls between 0.0001 and 0.5 mols, preferably between 0.001 and 0.2 mols in terms of the transition metal atom in the compound, relative to one kg of the silane compound-processed clay. If the amount of the transition metal compound added is smaller than 0.0001 mols, the polymerization activity of the catalyst produced will be low; but if larger than 0.5 mols, the activity of the catalyst per the transition metal will be low.

While or after the constituent components are contacted with each other to prepare the intended catalyst, a polymer such as polyethylene, polypropylene, polystyrene or the like, and even a solid inorganic oxide such as silica, alumina or the like may be present in or may be added to the mixture for the catalyst.

3. Production of Olefin Polymers and Styrene Polymers:

Olefin polymers can be produced by homopolymerizing or copolymerizing olefins in the presence of the catalyst for olefin polymerization noted above of the invention. Styrene polymers can also be produced by homopolymerizing or copolymerizing styrene compounds in the presence of the catalyst. The copolymerization includes copolymerization of two or more different types of olefins, copolymerization of two or more different types of styrene compounds, and copolymerization of styrene compounds and olefins, by which are produced copolymers.

(1) Olefins:

Olefins for use in the invention include, for example, α-olefins such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1-pentene, 3,4-dimethyl-1-pentene, 4,4-dimethyl-1-pentene, vinylcyclohexane, etc.; dienes such as 1,3-butadiene, 1,4-butadiene, 1,5-hexadiene, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc. Styrene monomers for use in the invention include, for example, styrene; alkylstyrenes such as p-methylstyrene, p-ethylstyrene, p-propylstyrene, p-isopropylstyrene, p-butylstyrene, p-t-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; as well as trimethylsilylstyrene, vinylbenzoates, divinylbenzene, etc.

(2) Polymerization Conditions:

The polymerization may be effected in the absence or presence of a solvent. The solvent may include, for example, hydrocarbons such as butane, pentane, hexane, toluene, cyclohexane, etc.; and liquefied α-olefins. The temperature for the polymerization may fall between −50° C. and 250° C. The pressure for it is not specifically defined, but preferably falls between normal pressure and 2000 kgf/cm². Hydrogen may be present in the polymerization system, which serves as a molecular weight-controlling agent.

(3) Styrene Polymers:

Styrene polymers having a high-degree syndiotactic structure in the styrene chain moiety may be produced in the method of using the catalyst of the invention. The high-degree syndiotactic structure referred to herein for the styrene chain moiety in the styrene polymers produced is meant to indicate that the stereochemical structure of the stryene polymers has a high degree of syndiotacticity, in which the side chains of phenyl groups or substituted phenyl groups are positioned alternately in the opposite sites relative to the main chain composed of carbon-carbon bonds. The degree of tacticity of the polymers may be determined through nuclear magnetic resonance with an isotopic carbon ($^{13}$C-NMR). The degree of tacticity to be determined through this method is represented by the ratio of continuous plural constituent units existing in polymers. For example, diad indicates 2 units; triad indicates 3 units; and pentad indicates 5 units. The "styrene polymers having a syndiotactic structure" as referred to herein are meant to indicate polystyrenes having a degree of syndiotacticity of such that the racemidiad proportion is not smaller than 75%, preferably not smaller than 85%, or the racemipentad proportion is not smaller than 30%, preferably not smaller than 50%, as well as their mixtures, and copolymers consisting essentially of such polystyrenes.

THIRD ASPECT OF THE INVENTION

1. Constituent Components for Olefin Polymerization Catalyst:

The catalyst for olefin polymerization of the third aspect of the invention (this will be simply referred to as "the invention" in this section) is prepared by contacting (a) a transition metal compound with a silane compound-processed clay. The silane compound-processed clay is prepared by contacting (b) a clay material with (c) a silane compound of formula (III-1) and which gives absorption peaks in a range falling between 1090 and 1050 cm$^{-1}$ and/or in a range falling between 1015 and 995 cm$^{-1}$ in infrared absorption spectrometry. Optionally, (d) an organic metal compound with a metal of Groups 1, 2, 13 and 14 of the Periodic Table maybe added to the catalyst. Constituent components that are favorably used for preparing the catalyst are mentioned below.

(a) Transition Metal Compounds:

For the transition metal compounds for the component (a) herein, referred to are those mentioned hereinabove in the section of the second aspect of the invention.

(b) Clay Materials:

(1) Clay and Clay Minerals:

Clay or clay minerals may be used as the component (b). Clay is an aggregate of fine hydrous silicate minerals. It is plastic when kneaded with a suitable amount of water, and is rigid when dried. When baked at high temperatures, it is sintered. Clay minerals are hydrous silicates which are the essential components constituting clay.

These are not limited to only natural ones, but synthetic products of those substances are employable herein.

(2) Ion-exchanging Layered Compounds:

As the component (b), also usable are ion-exchanging layered compounds, which are characterized by the crystal structure of such that a plurality of crystal planes formed through ionic bonding or the like are laminated in parallel layers via weak bonding force between the adjacent layers, and in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of the smectite family; illite and sericite of the mica family; and mixed layer minerals of smectites and micas, or those of micas and vermiculites.

As synthetic products, known are fluoro-tetrasilicon mica, laponite, smectone, etc.

Also mentioned are ion-exchanging compounds having a layered crystal structure, such as α-Zr(HPO$_4$)$_2$, γ-Zr(HPO$_4$)$_2$, α-Ti(HPO$_4$)$_2$, γ-Ti(HPO$_4$)$_2$, etc. These are not clay minerals.

Examples of clay and clay minerals which do not belong to ion-exchanging layered compounds and which are usable as the component (b) include clay having a low montmorillonite content and referred to as bentonite; kibushi clay comprising montmorillonite and many other components; gairome clay; sepiolite and palygorskite having a fibrous morphology; and amorphous or low-crystalline allophane, imogolite, etc.

The component (b) is contacted with the silane compound (c) and optionally the alkylating agent (d), and it is desirable that clay, clay minerals and ion-exchanging layered compounds for the component (b) are chemically treated for the purpose of removing impurities from them or for modifying their structures and functions.

The chemical treatment referred to herein indicates both the surface treatment to remove impurities from surfaces and the treatment to modify the crystal structure of clay. Concretely, it includes acid treatment, alkali treatment, salt treatment, organic treatment, etc.

The acid treatment is to remove impurities from surfaces, while releasing cations such as aluminium, iron, magnesium and the like from crystal structures to thereby enlarge surface areas. The alkali treatment is to destroy the crystal structure of clay, thereby modifying the structure of clay. The salt treatment and the organic treatment are to form ionic complexes, molecular complexes, organic complexes, etc., whereby surface areas and layer-to-layer spaces may be changed. Owing to their ion-exchanging ability, the interlayer exchangeable ions in the compounds may be exchanged with any other bulky ions to give layered substances having enlarged interlayer spaces.

(3) The substances of the component (b) noted above may be directly used as they are, or, if desired, additional water may be adsorbed onto them, or they may be heated and dehydrated prior to being used.

(4) As the component (b), preferred are clay and clay minerals in view of their activity. Most preferred are phyllosilicic acid compounds, of which smectite is desirable, and montmorillonite is more desirable.

(c) Silane Compounds:

As comprising a silane compound-processed clay, the catalyst of the invention has higher activity. As the silane compounds for the component (c), preferred are those of formula (III-1) mentioned hereinabove.

Silane compounds of formula (III-1) include bis-silyl compounds, $X_{4-n}Si(CH_2)_mSiX_{4-n}$ (where m is from 1 to 10; and n is 1, 2 or 3) having plural Si's in the molecule, and also poly-nuclear polysiloxanes, polysilazanes, etc. The substituent R in formula (III-1) includes an alkyl group, a phenyl group, a silyl group, and a hydride group, and is preferably an alkyl group. The substituent X therein includes a halide, a hydroxide, an alkoxide and an amide, and is preferably a halide.

Specific examples of the silane compounds include trialkylsilylchlorides such as trimethylsilylchloride, triethylsilylchloride, triisopropylsilylchloride, t-butyldimethylsilylchloride, t-butyldiphenylsilylchloride, phenethyldimethylsilylchloride, etc.; dialkylsilyldichlorides such as dimethylsilyldichloride, diethylsilyldichloride, diisopropylsilyldichloride, di-n-hexylsilyldichloride, dicyclohexylsilyldichloride, docosylmethylsilyl dichloride, bis(phenethyl)silyldichloride, methylphenethylsilyldichloride, diphenylsilyldichloride, dimethylsilyldichloride, ditolylsilyldichloride, etc.

They further include other halides to be derived from the compounds noted above by substituting the chloride moiety with any other halogens; disilazanes such as bis(trimethylsilyl)amide, bis(triethylsilyl)amide, bis(triisopropylsilyl)amide, bis(dimethylethylsilyl)amide, bis(diethylmethylsilyl)amide, bis(dimethylphenylsilyl)amide, bis(dimethyltolylsilyl)amide, bis(dimethylmesitylsilyl)amide, etc.; trialkylsilyl hydroxides such as trimethylsilylhydroxide, triethylsilyl hydroxide, triisopropylsilylhydroxide, tert-butyldimethylsilylhydroxide, phenethyldimethylsilylhydroxide, etc.; polysilanols generally referred to as peralkylpolysiloxypolyols; bissilyls such as bis(methyldichlorosilyl)methane, 1,2-bis(methyldichlorosilyl)ethane, bis(methyldichlorosilyl)octane, bis(triethoxysilyl)ethane, etc.; and silane hydrides such as dimethylchlorosilane, (N,N-dimethylamino)dimethylsilane, diisobutylchlorosilane, etc. One of the silane compounds may be used as the component (c). As the case may be, however, two or more of the silane compounds may be used, as combined in any desired manner. (d) Organic metal compounds with a metal of Group 1, 2, 13 or 14 of the Periodic Table:

In the invention, optionally used is an organic metal compound with a metal of Group 1, 2, 13 or 14 of the Periodic Table, as the component (d) for the catalyst. For the organic metal compounds with a metal of Group 1, 2, 13 or 14 for the component (d) herein, referred to are those mentioned hereinabove in the section of the second aspect of the invention.

Also for the method for contacting the component (d) with the other constituent components, referred to are those mentioned hereinabove in the section of the second aspect.

2. Method for Preparing Catalyst:

The catalyst of the invention comprises a silane compound-processed clay giving specific absorption peaks in a specific range in infrared absorption spectrometry. For preparing the silane compound-processed clay, a layered compound as produced through intercalation of a clay material with a tertiary ammonium hydrochloride may be treated with a silane compound, or a clay hydride as produced through acid pretreatment of a clay material may be treated with a silane compound. The resulting, silane compound-processed clay gives absorption peaks in a range falling between 1090 and 1050 cm$^{-1}$ and/or in a range falling between 1015 and 995 cm$^{-1}$ in infrared absorption spectrometry, with which the catalyst for olefin polymerization of the invention has high polymerization activity.

For preparing the silane compound-processed clay, a clay material for the component (b) is first added to water to prepare aqueous clay colloid. Next, a silane compound for the component (c) is added to the resulting aqueous clay colloid, and stirred under heat, by which the clay material is treated with the silane compound. The temperature for the treatment may fall between −30 and 100° C. In order to shorten the time for catalyst preparation, it is desirable that the temperature for the treatment is 100° C. or so. Though varying depending on the type of the clay material to be treated and on the temperature for the treatment, the treatment time may fall between 0.5 and 24 hours.

For producing the catalyst for olefin polymerization of the invention, a clay material is treated with a silane compound for the component (c), preferably with that of formula (III-1) noted above, thereby preparing the silane compound-processed clay that gives absorption peaks in a range falling between 1090 and 1050 cm$^{-1}$, preferably between 1090 and 1060 cm$^{-1}$, and/or in a range falling between 1015 and 995 cm$^{-1}$ in infrared absorption spectrometry. Depending on the type of the silane compound used for the clay treatment, for example, when a silane compound having an aliphatic alkyl group such as methyl and ethyl groups is used for the treatment, obtained is a silane compound-processed clay that gives absorption peaks in both the range between 1090 and 1050 cm$^{-1}$ and the range between 1015 and 995 cm$^{-1}$ in IR absorption spectrometry.

The absorption peaks seen in the infrared absorption spectrum of the thus-produced, silane compound-processed clay are not seen in that of the starting clay material.

Specifically, the absorption peaks are peculiar to the products as produced through contact treatment of a clay material with a silane compound for the component (c) such as that mentioned hereinabove.

The amount of the silane compound to be used herein for the component (c) may fall between 0.001 and 1000 mols, preferably between 0.01 and 100 mols in terms of the silicon atom, relative to one kg of the clay material for the component (b) to be treated therewith. If the amount of the silane compound used is smaller than 0.001 mols, the polymerization activity of the catalyst to be produced will be low; and if larger than 1000 mols, the activity will also be low.

Through the treatment with a silane compound, the aqueous clay colloid changes into a suspension of clay slurry. The resulting clay slurry is again washed with water, and then filtered. The residue is dried to be a dry solid.

To the resulting silane compound-processed clay, optionally added is the component (d). The amount of the component (d) may fall between 0.1 and 1000 mols, preferably between 1 and 100 mols in terms of the constituent metal atom in the component (d), relative to one kg of the silane compound-processed clay. If its amount is smaller than 0.1 mols, the component (d) added could not satisfactorily exhibit its effect to improve the polymerization activity of the catalyst produced;but even if larger than 1000 mols, the effect of the component (d) added could not be augmented any more. For the treatment of contacting the silane compound-processed clay with the component (d), preferably employed is a method of suspending or dissolving the two components in an organic solvent such as, for example, pentane, hexane, heptane, toluene, xylene or the like, in which the two are mixed.

Next, the silane compound-processed clay having been prepared in the manner noted above is contacted with a transition metal compound for the component (a). For this, it is desirable that the amount of the transition metal compound to be used falls between 0.0001 and 0.5 mols, preferably between 0.001 and 0.2 mols in terms of the transition metal atom in the compound, relative to one kg of the silane compound-processed clay. If the amount of the transition metal compound added is smaller than 0.0001 mols, the polymerization activity of the catalyst produced will be low; but if larger than 0.5 mols, the activity of the catalyst per the transition metal will be low.

While or after the constituent components are contacted with each other to prepare the intended catalyst, a polymer such as polyethylene, polypropylene, polystyrene or the like, and even a solid inorganic oxide such as silica, alumina or the like may be present in or may be added to the mixture for the catalyst.

3. Production of Olefin Polymers:

Olefin polymers can be produced by homopolymerizing or copolymerizing olefins in the presence of the catalyst for olefin polymerization noted above of the invention. Olefins herein are meant to include α-olefins, dienes, cyclic olefins, and also styrene compounds; and olefin polymers are meant to include homopolymers and copolymers of α-olefins, homopolymers and copolymers of styrene compounds, and even copolymers of α-olefins and styrene compounds. As comonomers for producing styrene copolymers, usable are various unsaturated compounds generally used as comonomers for styrene polymerization. For example, they include unsaturated carboxylic acids, unsaturated esters, etc.

(1) Preferred Monomers for Polymerization:

As monomers for polymerization herein, for example, preferred are α-olefins such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1-pentene, 3,4-dimethyl-1-pentene, 4,4-dimethyl-1-pentene, vinylcyclohexane, etc.; dienes such as 1,3-butadiene, 1,4-butadiene, 1,5-hexadiene, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc. Styrene monomers are also preferred, including, for example, styrene; alkylstyrenes such as p-methylstyrene, p-ethylstyrene, p-propylstyrene, p-isopropylstyrene, p-butylstyrene, p-t-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; as well as trimethylsilylstyrene, vinylbenzoates, divinylbenzene, etc.

(2) Polymerization Conditions:

The polymerization may be effected in the absence or presence of a solvent. The solvent may include, for example, hydrocarbons such as butane, pentane, hexane, toluene, cyclohexane, etc.; and liquefied α-olefins. The temperature for the polymerization may fall between −50° C. and 250° C. The pressure for it is not specifically defined, but preferably falls between normal pressure and 2000 kgf/cm$^2$. Hydrogen may be present in the polymerization system, which serves as a molecular weight-controlling agent.

(3) Styrene Polymers:

Styrene polymers having a high-degree syndiotactic structure in the styrene chain moiety may be produced in the method of using the catalyst of the invention. The high-degree syndiotactic structure referred to herein for the styrene chain moiety in the styrene polymers produced is meant to indicate that the stereochemical structure of the stryene polymers has a high degree of syndiotacticity, in which the side chains of phenyl groups or substituted phenyl groups are positioned alternately in the opposite sites relative to the main chain composed of carbon-carbon bonds. The degree of tacticity of the polymers may be determined through nuclear magnetic resonance with an isotopic carbon ($^{13}$C-NMR). The degree of tacticity to be determined through this method is represented by the ratio of continuous plural constituent units existing in polymers. For example, diad indicates 2 units; triad indicates 3 units; and pentad indicates 5 units. The "styrene polymers having a syndiotactic structure" as referred to herein are meant to indicate polystyrenes having a degree of syndiotacticity of such that the racemidiad proportion is not smaller than 75%, preferably not smaller than 85%, or the racemipentad proportion is not smaller than 30%, preferably not smaller than 50%, as well as their mixtures, and copolymers consisting essentially of such polystyrenes.

The invention is concretely described hereinunder with reference to the following Examples, which, however, are not intended to restrict the scope of the invention.

FIRST ASPECT OF THE INVENTION

EXAMPLE I-1

(1) Chemical-treated Clay A:

40 g of a commercial product of montmorillonite (Kunipia F, manufactured by Kunimine Industry Co.) was ground in a grinder for 4 hours. 20 g of the powdered montmorillonite was put into a three-neck separable flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. The treatment with magnesium chloride followed by washing with water was repeated once again. Thus was obtained magnesium chloride-processed montmorillonite. Next, this was dispersed in 160 ml of an aqueous solution of 6% HCl, and stirred under reflux for 2 hours. After having been thus processed, this was washed with water through repeated filtration until the filtration wash became neutral, and then dried. The resulting clay slurry was filtered under pressure.

The residue was dried in vacuum at room temperature for 18 hours. Thus was obtained a chemical-treated clay A.

The water content of the chemical-treated clay A was 15%. To determine its water content, a dry sample of the chemical-treated clay A was put into a muffle furnace, heated up to 150° C. over a period of 30 minutes, and kept at the temperature for 1 hours, and the weight loss in the sample was measured. The weight loss thus measured indicates the water content of the sample.

(2) Modification with Silane Compound:

1.0 g of the chemical-treated clay A (having a water content of 15% by weight) and 50 ml of distilled water were put into a three-neck flask having a capacity of 300 ml, and mixed to prepare clay slurry. With stirring the clay slurry, 1.13 g (5.2 mmols) of methylphenethylsilyl dichloride was gradually and dropwise added thereto over a period of 15 minutes. The mixture was further stirred for 2 hours to prepare a slurry of fine clay grains. With further stirring the slurry, water was evaporated away from it at room temperature under reduced pressure to obtain a silane-processed montmorillonite powder. 25 ml of toluene was added to the powder and stirred for 1 hour to prepare a suspension containing the powder. The solvent was evaporated away from the suspension at room temperature under reduced pressure. Next, the resulting powder was further treated with 25 ml of a toluene solution of 0.5 mol/liter of triisobutylaluminium, and washed. Then, the silane-processed clay was suspended in 50 ml of toluene to prepare a clay slurry A.

(3) Contact with Transition Metal Compound:

50 ml of the clay slurry A that had been prepared previously, and 100 μmols of zirconocene dichloride were put into a Schlenk's tube having a capacity of 300 ml at room temperature, and stirred for 0.5 hours at the temperature. After the reaction mixture was left static for a while, the supernatant was removed from it, and the remaining residue was washed twice with 200 ml of toluene. Toluene was again added to the thus-washed residue to prepare a catalyst slurry of being 50 ml in volume.

(4) Polymerization of Ethylene:

400 ml of toluene, 0.5 mmols of triisobutylaluminium, and 5 ml (corresponding to 0.1 g of the solid clay) of the catalyst slurry that had been prepared in the previous step (3) were put into a 1.6 liter autoclave in that order, and heated at 70° C. After this was kept at the temperature for 5 minutes, ethylene was continuously fed thereinto to have a pressure of 5 kg/cm$^2$G, and polymerized for 12 minutes. Next, methanol was added to this to stop the polymerization.

The polymer thus produced was taken out through filtration, and dried at 90° C. under reduced pressure for 12 hours. The polymer thus obtained weighed 61.8 g. The polymerization activity per the catalyst used was 3090 g/g-catalyst/hr.

EXAMPLE I-2

(1) Chemical-treated Clay B:

A chemical-treated clay B was prepared in the same manner as in the step of preparing the chemical-treated clay A. In this, however, after the clay slurry in the final stage was filtered under pressure, 20 ml of distilled water was added to the resulting filtrate, clay paste, and kneaded. Then, the resulting mixture was directly dried in vacuum at room temperature for 24 hours to obtain the chemical-treated clay B. The water content of the chemical-treated clay B was 15%.

(2) Modification with Silane Compound:

1.0 g of the chemical-treated clay B (having a water content of 15% by weight) and 50 ml of toluene were put into a Schlenk's tube having a capacity of 300 ml to prepare clay slurry. With stirring the clay slurry, 1.13 g (5.2 mmols) of methylphenethylsilyl dichloride was gradually and dropwise added thereto over a period of 15 minutes. The mixture was further stirred for 3 days in a nitrogen atmosphere at room temperature. Next, the resulting slurry was treated with a toluene solution of triisobutylaluminium, and washed. Toluene was added thereto to prepare a fine clay slurry B. This had a total volume of 50 ml.

(3) Contact with Transition Metal Compound:

This was effected in the same manner as in (3) in Example I-1, except that the clay slurry B was used herein.

(4) Polymerization of Ethylene:

This was effected in the same manner as in (4) in Example I-1, except that the polymerization time was 15 minutes. In this, obtained was 56.6 g of a polymer. The polymerization activity per the catalyst used was 2260 g/g-catalyst/hr.

EXAMPLE I-3

(1) Chemical-treated Clay C:

A chemical-treated clay C was prepared in the same manner as in the step of preparing the chemical-treated clay A. In this, however, after the clay slurry in the final stage was filtered under pressure, the resulting residue was dried in vacuum at room temperature for 72 hours to obtain the chemical-treated clay C. The water content of the chemical-treated clay C was 5%.

(2) Modification with Silane Compound:

This was effected in the same manner as in (2) in Example I-2, except that the clay slurry C was used herein in place of the chemical-treated clay B. Thus was prepared a silane-processed clay slurry C.

(3) Contact with Transition Metal Compound:

This was effected in the same manner as in (3) in Example I-2, except that the clay slurry C was used herein.

(4) Polymerization of Ethylene:

This was effected in the same manner as in (4) in Example I-2. In this, obtained was 26.1 g of a polymer. The polymerization activity per the catalyst used was 1040 g/g-catalyst/hr.

EXAMPLE I-4

(1) Contact with Transition Metal Compound:

50 ml of the clay slurry A and 1 ml of dimethylsilylenebis (2-methyl-4,5-benzindenyl)zirconium dichloride (10 μmols/ml) were put into a Schlenk's tube having a capacity of 300 ml at room temperature, and stirred for 0.5 hours at the temperature. Thus was prepared 51 ml of a catalyst slurry.

(2) Polymerization of Propylene:

400 ml of toluene, 1.0 mmol of triisobutylaluminium, and 5.1 ml (corresponding to 0.1 g of the solid clay) of the catalyst slurry that had been prepared in (1) in Example I-4 were put into a 1.6 liter autoclave, and heated at 70° C. After this was kept at the temperature for 5 minutes, propylene was continuously fed thereinto to have a pressure of 5 kg/cm$^2$G, and polymerized for 20 minutes. Next, methanol was added to this to stop the polymerization.

The polymer thus produced was taken out through filtration, and dried at 90° C. under reduced pressure for 12 hours. The polymer thus obtained weighed 79.1 g. The polymerization activity per the catalyst used was 2370 g/g-catalyst/hr. The activity per zirconium in the complex used was 1.3 tons/g-Zr/hr.

COMPARATIVE EXAMPLE I-1

(1) Chemical-treated Clay D:

A chemical-treated clay D was prepared in the same manner as in the step of preparing the chemical-treated clay A. In this, however, after the clay slurry in the final stage was filtered under pressure, the resulting residue was dried at 150° C. for 2 hours to obtain the chemical-treated clay D. The water content of the chemical-treated clay D was 0%.

(2) Modification with Silane Compound:

This was effected in the same manner as in (2) in Example I-2, except that the clay slurry D was used herein in place of the chemical-treated clay B. Thus was prepared a silane-processed clay slurry D.

(3) Contact with Transition Metal Compound:

This was effected in the same manner as in (3) in Example I-2, except that the clay slurry D was used herein.

(4) Polymerization of Ethylene:

This was effected in the same manner as in (4) in Example I-2. In this, obtained was 12.8 g of a polymer. The polymerization activity per the catalyst used was 510 g/g-catalyst/hr.

SECOND ASPECT OF THE INVENTION

EXAMPLE II-1

(1) Preparation of Silane-processed Clay Slurry A:

500 ml of distilled water was put into a three-neck flask having a capacity of 2 liters. With stirring it, 2.5 g of Na-montmorillonite (Kunipia F from Kunimine Industry) was gradually added thereto. The ratio, water (ml)/clay (g) was 200. Next, the resulting mixture was stirred at room temperature for 2 hours to prepare aqueous clay colloid.

To the aqueous clay colloid, gradually and dropwise added was 1 ml of phenethylmethyldichlorosilane. The resulting mixture was stirred at room temperature for 1 hour, then heated up to 100° C., and further stirred at the temperature for 4 hours. After having been thus stirred, the clay colloid changed to clay slurry.

Next, 500 ml of distilled water was added to the clay slurry, and then filtered in a pressure container, for which was used a membrane filter having a pore size of 1 μm with an aerial pressure of 1 kg/cm$^2$G being applied thereto. The filtration took 10 minutes.

Next, the resulting solid residue was dried at room temperature. One g of the dry solid was suspended in 25 ml of toluene, to which was added 25 ml of a toluene solution of triisobutylaluminium (having a concentration of 0.5 mols/liter), and stirred at 100° C. for 1 hour. The resulting slurry was washed with toluene, and toluene was added thereto to be 50 ml in total. Thus was prepared a silane-processed clay slurry A.

(2) Preparation of Catalyst for Olefin Polymerization:

5 ml of the silane-processed slurry A having been prepared in the previous step (1) was put into a Schlenk's tube, to which was added 1 ml of a toluene solution of a transition metal complex, dicyclopentadienylzirconium dichloride having a concentration of 10 μmols/ml, and stirred at room temperature for 30 minutes to prepare a catalyst for polymerization.

(3) Polymerization of Ethylene:

400 ml of toluene, 0.5 mmols of triisobutylaluminium, and 5 ml (corresponding to 0.1 g of the solid clay) of the catalyst for polymerization that had been prepared in the previous step (2) were put into a 1.6 liter autoclave in that order, and heated at 70° C. After this was kept at the temperature for 5 minutes, ethylene was continuously fed thereinto to have a pressure of 5 kg/cm$^2$G, and polymerized for 10 minutes. Next, methanol was added to this to stop the polymerization.

The polymer thus produced was taken out through filtration, and dried at 90° C. under reduced pressure for 12 hours. The polymer thus obtained weighed 33.5 g. The polymerization activity per the catalyst used was 2010 g/g-catalyst/hr.

EXAMPLE II-2

(1) Preparation of Silane-processed Clay Slurry B:

A silane-processed clay slurry B was prepared in the same manner as in the step (1) in Example II-1, except that 250 ml of distilled water was used in place of 500 ml of distilled water to prepare a clay colloid. In this, the ratio of water (ml)/clay (g) was 100.

(2) Preparation of Catalyst for Olefin Polymerization:

A catalyst for olefin polymerization was prepared in the same manner as in (2) in Example II-1, except that 5 ml of the silane-processed clay slurry B prepared in the previous step (1) was used herein.

(3) Polymerization of Ethylene:

Ethylene was polymerized in the same manner as in (3) in Example II-1, except that the catalyst for olefin polymerization having been prepared in the previous step (2) was used and that the polymerization time was 20 minutes. In this, obtained was 46.1 g of a polymer. The polymerization activity per the catalyst used was 1380 g/g-catalyst/hr.

EXAMPLE II-3

(1) Preparation of Silane-processed Clay Slurry C:

250 ml of distilled water was put into a three-neck flask having a capacity of 2 liters. With stirring it, 2.5 g of Na-montmorillonite (Kunipia F from Kunimine Industry) was gradually added thereto. The ratio, water (ml)/clay (g) was 100. Next, the resulting mixture was stirred at room temperature for 2 hours to prepare aqueous clay colloid.

To the aqueous clay colloid, gradually and dropwise added was 1 ml of phenethylmethyldichlorosilane. The resulting mixture was stirred at room temperature for 1 hour, then heated up to 100° C., and further stirred at the temperature for 4 hours. After having been thus stirred, the clay colloid changed to clay slurry.

Next, 10 ml of concentrated hydrochloric acid (aqueous solution having a concentration of 35% by weight) was added to the clay slurry, and stirred for 1 hour.

500 ml of distilled water was added to the thus-processed clay slurry, and then filtered in a pressure container, for which was used a membrane filter having a pore size of 1 μm with an aerial pressure of 1 kg/cm$^2$G being applied thereto. The filtration took 10 minutes.

Next, the resulting solid residue was dried at room temperature. One g of the dry solid was suspended in 25 ml of toluene, to which was added 25 ml of a toluene solution of triisobutylaluminium (having a concentration of 0.5 mols/liter), and stirred at 100° C. for 1 hour. The resulting slurry was washed with toluene, and toluene was added thereto to be 50 ml in total. Thus was prepared a silane-processed clay slurry C.

(2) Preparation of Catalyst for Olefin Polymerization:

A catalyst for olefin polymerization was prepared in the same manner as in (2) in Example II-1, except that 5 ml of the silane-processed clay slurry C prepared in the previous step (1) was used herein.

(3) Polymerization of Ethylene:

Ethylene was polymerized in the same manner as in (3) in Example II-1, except that the catalyst for olefin polymerization having been prepared in the previous step (2) was used and that the polymerization time was 20 minutes. In this, obtained was 26.2 g of a polymer. The polymerization activity per the catalyst used was 787 g/g-catalyst/hr.

EXAMPLE II-4

(1) Preparation of Catalyst for Olefin Polymerization:

5 ml of the silane-processed slurry A having been prepared in(1) in Example II-1 was put into a Schlenk's tube having a capacity of 300 ml, to which was added 1 ml of a toluene solution of a transition metal complex, dimethylsilylenebis(2-methyl-4,5-benzindenyl)zirconium dichloride having a concentration of 2 μmols/ml at room temperature, and stirred at the temperature for 30 minutes to prepare a catalyst for polymerization.

(2) Polymerization of Propylene:

400 ml of toluene and 2.0 mmol of triisobutylaluminium were put into a 1.6 liter autoclave, and heated at 70° C. Then, 6 ml (corresponding to 0.1 g of the solid clay) of the catalyst for polymerization that had been prepared in the previous step (2) was put into the autoclave, and heated at 70° C. After the mixture was kept at the temperature for 5 minutes, propylene was continuously fed thereinto to have a pressure of 5 kg/cm$^2$G, and polymerized for 30 minutes. Next, methanol was added to this to stop the polymerization.

The polymer thus produced was taken out through filtration, and dried at 90° C. under reduced pressure for 12 hours. The polymer thus obtained weighed 75.5 g. The polymerization activity per the catalyst used was 1510 g/g-catalyst/hr. The activity per the zirconium atom in the transition metal complex used herein was 830 kg/g-Zr/hr.

EXAMPLE II-5

(1) Preparation of Silane-processed Clay Slurry D:

In the same manner as in (1) in Example II-1, except that dicyclohexyldichlorosilane was used in place of phenethylmethyldichlorosilane for silane treatment, herein prepared was a silane-processed clay slurry D.

(2) Preparation of Catalyst for Olefin Polymerization:

5 ml of the silane-processed clay slurry D having been prepared in the previous step (2) was put into a Schlenk's tube having a capacity of 300 ml at room temperature, and stirred for 30 minutes at the temperature.

(3) Polymerization of Propylene:

400 ml of toluene and 2.0 mmols of triisobutylaluminium were put into a 1.6 liter autoclave, and heated at 70° C. Then, 1 ml of toluene solution of a transition metal complex, dimethylsilylenebis (2-methyl-4 ,5-benzindenyl)zirconium dichloride having a concentration of 1 μmol/ml was added thereto. 5 minutes after the addition, 5 ml (corresponding to 0.1 g of the solid clay) of the catalyst for polymerization that had been prepared in the previous step (2) was put into the autoclave. After the mixture was kept at 70° C. for 5 minutes, propylene was continuously fed thereinto to have a pressure of 5 kg/cm$^2$G, and polymerized for 30 minutes. Next, methanol was added to this to stop the polymerization.

The polymer thus produced was taken out through filtration, and dried at 90° C. under reduced pressure for 12 hours. The polymer thus obtained weighed 39.3 g. The polymerization activity per the catalyst used was 786 g/g-catalyst/hr. The activity per the zirconium atom in the transition metal complex used herein was 864 kg/g-Zr/hr.

EXAMPLE II-6

(1) Preparation of Catalyst for Olefin Polymerization:

5 ml of the silane-processed slurry A having been prepared in(1) in Example II-1 was put into a Schlenk's tube having a capacity of 300 ml, to which was added 1 ml of a toluene solution of a transition metal complex, nickel complex of the following formula having a concentration of 5 μmols/ml, and stirred at room temperature for 30 minutes to prepare a catalyst for polymerization.

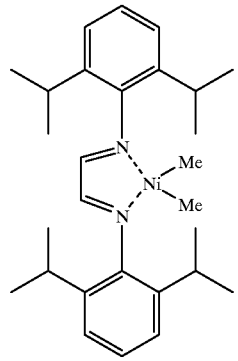

(2) Polymerization of Ethylene:

A 1.6 liter autoclave was heated at 80° C., fully evacuated and dried, then purged with dry nitrogen to be at atmospheric pressure, and cooled to room temperature. In that condition, 400 ml of toluene, 0.5 mmols of triisobutylaluminium and the catalyst for polymerization (corresponding to 0.1 g of the solid clay) having been prepared in the previous (1) were put into the autoclave in a dry nitrogen atmosphere, and then heated at 40° C. After the mixture was kept at 40° C. for 5 minutes, ethylene was continuously fed thereinto to have a pressure of 8 kg/cm$^2$G, and polymerized for 1 hour. Next, methanol was added to this to stop the polymerization.

The polymer thus produced was taken out through filtration, and dried at 90° C. under reduced pressure for 12 hours. The polymer thus obtained weighed 15.2 g. The polymerization activity per the catalyst used was 152 g/g-catalyst/hr.

COMPARATIVE EXAMPLE II-1

(1) Preparation of Silane-processed Clay Slurry:

The same process as in Example II-1 was repeated, except that 50 ml, but not 500 ml, of distilled water was used in preparing aqueous clay colloid. In this, the ratio of water (ml)/clay (g) was 20. However, the aqueous clay colloid wholly gelled, while being prepared, and could not be stirred to uniformly mix the silane compound added thereto.

COMPARATIVE EXAMPLE II-2

(1) Preparation of Silane-processed Clay Slurry:

20 g of magnesium chloride 6-hydrate and 100 ml of distilled water were put into a three-neck flask having a capacity of 500 ml. With stirring them, 20 g of Na-montmorillonite (Kunipia F from Kunimine Industry) was gradually added thereto. Then, the resulting clay slurry was stirred at 90° C. for 0.5 hours. After having been thus processed, the solid component was washed with water. This operation was repeated once again. Thus was prepared magnesium chloride-processed montmorillonite.

Next, this was dried, and dispersed in 160 ml of aqueous 6% HCl, and stirred under reflux for 2 hours. After having been thus processed, the slurry was filtered, and 1 liter of distilled water was added to the resulting residue. Thus was prepared HCl-processed montmorillonite slurry.

The HCl-processed montmorillonite slurry was filtered in a 1.5 liter pressure container. The resulting residue was dispersed in 5 liters of water, and again filtered in a 7.5 liter pressure filter, for which was used a membrane filter having a pore size of 1 µm with an aerial pressure of 3 kg/cm$^2$G being applied thereto. Thus was obtained 14 g of a chemical-processed clay (after having been dried in vacuum at room temperature for 20 hours). In the final step, the filtration took a lot of time of 36 hours.

Next, to 1 g of the chemical-processed clay, added were 10 ml of toluene and 1.0 ml of phenethylmethyldichlorosilane, and stirred at room temperature for 72 hours. The resulting silane-processed clay was washed with toluene, and suspended in 25 ml of toluene, to which was added 25 ml of a toluene solution of triisobutylaluminium having a concentration of 0.5 mols/liter, and stirred at 100° C. for 1 hour. The resulting slurry was washed with toluene, and toluene was added thereto to be 50 ml in total. Thus was prepared a silane-processed clay slurry E.

(2) Preparation of Catalyst for Olefin Polymerization:

A catalyst for olefin polymerization was prepared in the same manner as in (2) in Example II-1, except that the silane processed clay slurry E prepared in the previous step (1) was used herein.

(3) Polymerization of Ethylene:

Ethylene was polymerized in the same manner as in (3) in Example II-1, except that the catalyst for olefin polymerization having been prepared in the previous step (2) was used herein. In this, the polymer produced weighed 31.6 g. The polymerization activity per the catalyst used was 1895 g/g-catalyst/hr.

THIRD ASPECT OF THE INVENTION

EXAMPLE III-1

(1) Preparation of Silane-processed Clay A:

500 ml of distilled water was put into a three-neck flask having a capacity of 2 liters. With stirring it, 2.5 g of Na-montmorillonite (Kunipia F from Kunimine Industry) was gradually added thereto. Next, the resulting mixture was stirred at room temperature for 2 hours to prepare aqueous clay colloid.

To the aqueous clay colloid, gradually and dropwise added was 1 ml of a silane compound, diethyldichlorosilane. The resulting mixture was stirred at room temperature for 1 hour, then heated up to 100° C., and further stirred at the temperature for 4 hours. After having been thus stirred, the clay colloid changed to clay slurry.

Next, 500 ml of distilled water was added to the clay slurry, and then filtered in a pressure container, for which was used a membrane filter having a pore size of 1 µm with an aerial pressure of 1 kg/cm$^2$G being applied thereto. The filtration took 15 minutes.

Next, the resulting solid residue was dried under reduced pressure at room temperature for 8 hours. Thus was prepared a silane-processed clay A.

2 mg of the thus-prepared, powdery, silane-processed clay A and 200 mg of potassium bromide were ground and mixed in an agate mortar. The resulting powder mixture was shaped into tablets. The tablet was subjected to infrared absorption spectrometry. The pattern (spectrum A) is in FIG. 1.

On the other hand, 2 mg of the starting clay, Na-montmorillonite and 200 mg of potassium bromide were ground, mixed and shaped into tablets in the same manner as previously. The tablet was subjected to infrared absorption spectrometry. The pattern (spectrum B) is in FIG. 2.

The spectrum A and the spectrum B was compared with each other for the difference between the two. From this were calculated the specific peaks for the diethyldichlorosilane treatment additionally appearing in the pattern A. The specific absorption peaks are at 1071 cm$^{-1}$ and 1009 cm$^{-1}$. The difference spectrum C is in FIG. 3.

(2) Preparation of Catalyst for Olefin Polymerization:

One g of the silane-processed clay A that had been prepared in the previous step (1) was suspended in 25 ml of toluene, to which was added 25 ml of a toluene solution of triisobutylaluminium having a concentration of 0.5 mols/liter, and stirred at 100° C. for 1 hour. The resulting slurry was washed with toluene, and toluene was added thereto to be 50 ml in total.

5 ml of the slurry was put into a Schlenk's tube, to which was added 1 ml of a toluene solution of a transition metal compound, dimethylsilylenebis(2-methyl-4,5-benzindenyl) zirconium dichloride having a concentration of 1 µmol/ml, and stirred at room temperature for 30 minutes to prepare a catalyst for polymerization.

(3) Polymerization of Propylene:

400 ml of toluene and 2.0 mmols of triisobutylaluminium were put into a 1.6 liter autoclave, and heated at 70° C. To this was added 6 ml (corresponding to 0.1 g of the solid clay) of the catalyst that had been prepared in the previous step (2).

The contents of the autoclave were again heated at 70° C., and kept at the temperature for 5 minutes, and propylene was continuously fed thereinto to have a pressure of 5 kg/cm$^2$G, and polymerized for 30 minutes. Next, methanol was added to this to stop the polymerization.

Polypropylene thus produced was taken out through filtration, and dried at 90° C. under reduced pressure for 12 hours. Its yield was 29.4 g. The polymerization activity per the catalyst used was 588 g/g-catalyst/hr. The activity per the zirconium metal in the catalyst was 650 kg/g-Zr/hr.

EXAMPLE III-2

(1) Preparation of Silane-processed Clay B:

A silane-processed clay B was prepared in the same manner as in (1) in Example III-1, except that a silane compound of triethylchlorosilane, but not diethyldichlorosilane, was used herein.

The silane-processed clay B was subjected to infrared absorption spectrometry in the same manner as previously. This gave specific absorption peaks at 1078 cm$^{-1}$, 1065 cm$^{-1}$ and 1003 cm$^{-1}$. The difference spectrum D is in FIG. 4.

(2) Preparation of Catalyst for Olefin Polymerization:

A catalyst for olefin polymerization was prepared in the same manner as in (2) in Example III-1, except that the silane-processed clay B as above, but not the silane-processed clay A, was used herein.

(3) Polymerization of Propylene:

Propylene was polymerized in the same manner as in (3) in Example III-1, except that the catalyst for olefin polymerization having been prepared in the previous step (2) was used herein. The yield of the polymer obtained herein was 20.8 g. The polymerization activity per the catalyst used was 417 g/g-catalyst/hr. The activity per the zirconium metal in the catalyst was 458 kg/g-Zr/hr.

EXAMPLE III-3

(1) Preparation of Silane-processed Clay C:

A silane-processed clay C was prepared in the same manner as in (1) in Example III-1, except that a silane compound of trimethylchlorosilane, but not diethyldichlorosilane, was used herein.

The silane-processed clay C was subjected to infrared absorption spectrometry in the same manner as previously. This gave specific absorption peaks at 1086 cm$^{-1}$, 1072 cm$^{-1}$, 1005 cm$^{-1}$ and 997 cm$^{-1}$. The difference spectrum E is in FIG. 5.

(2) Preparation of catalyst for Olefin Polymerization:

A catalyst for olefin polymerization was prepared in the same manner as in (2) in Example III-1, except that the silane-processed clay C as above, but not the silane-processed clay A, was used herein.

(3) Polymerization of Propylene:

Propylene was polymerized in the same manner as in (3) in Example III-1, except that the catalyst for olefin polymerization having been prepared in the previous step (2) was used herein. The yield of the polymer obtained herein was 31.8 g. The polymerization activity per the catalyst used was 636 g/g-catalyst/hr. The activity per the zirconium metal in the catalyst was 700 kg/g-Zr/hr.

COMPARATIVE EXAMPLE III-1

(1) Preparation of Silane-processed Clay C:

A silane-processed clay D was prepared in the same manner as in (1) in Example III-1, except that a silane compound of tetra-n-butylsilane, but not diethyldichlorosilane, was used herein.

The silane-processed clay D was subjected to infrared absorption spectrometry in the same manner as previously. As processed with tetra-n-butylsilane, this gave no specific absorption peak in a range falling between 1090 and 1050 cm$^{-1}$.

(2) Preparation of Catalyst for Olefin Polymerization:

A catalyst for olefin polymerization was prepared in the same manner as in (2) in Example III-1, except that the silane-processed clay D as above, but not the silane-processed clay A, was used herein.

(3) Polymerization of Propylene:

Propylene was polymerized in the same manner as in (3) in Example III-1, except that the catalyst for olefin polymerization having been prepared in the previous step (2) was used herein. The yield of the polymer obtained herein was 0.6 g. The polymerization activity per the catalyst used was 12 g/g-catalyst/hr. The activity per the zirconium metal in the catalyst was 13 kg/g-Zr/hr.

As described in detail hereinabove, the catalysts for olefin polymerization of the invention are prepared within a short period of time. They have high polymerization activity, and do not require a large amount of an organic aluminium compound. With them, therefore, high-quality polyolefins are produced efficiently, and the residual metal content of the polymers is much reduced.

What is claimed is:

1. A catalyst for olefin polymer production, which is obtained by contacting a product as prepared by contacting (A) clay, clay mineral or an ion-exchanging layered compound, (B) an organic silane compound and (C) water with each other, with (D) a transition metal complex containing a transition metal of Groups 4 to 6 or Groups 8 to 10 of the Periodic Table wherein component (A) and component (B) are contacted with each other in the presence of at least 100%, by weight of component (C), relative to the dry weight of component (A).

2. The catalyst for olefin polymer production as claimed in claim 1, which is obtained by contacting a product as prepared by contacting (A) clay, a clay mineral or an ion-exchanging layered compound, (B) an organic silane compound and (C) water with each other, with (D) a transition metal complex containing a transition metal of Groups 4 to 6 or Groups 8 to 10 of the Periodic Table and, wherein the product as prepared by contacting component (A), component (B) and component (C) is further contacted with (E) an alkylating agent.

3. The catalyst for olefin polymer production as claimed in claim 1, wherein the component (A), clay, a clay mineral or an ion-exchanging layered compound is selected from phyllosilicic acid compounds.

4. The catalyst for olefin polymer production as claimed in any one of claim 1, wherein the component (B), an organic silane compound has at least one alkyl group directly bonded to the silicon atom of the compound.

5. The catalyst for olefin polymer production as claimed in any one of claim 1, wherein the component (D), a transition metal complex containing a transition metal of Groups 4 to 6 or Groups 8 to 10 of the Periodic Table has a ligand having a carbon-carbon unsaturated bonding group or a carbon-nitrogen unsaturated bonding group.

6. The catalyst for olefin polymer production of any one claim 1 wherein the component (D), a transition metal complex containing a transition metal of Groups 4 to 6 or Groups 8 to 10 of the Periodic Table is represented by any of the following general formulae (I-1) to (I-4):

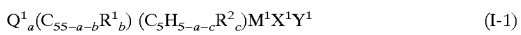

$$Q^1{}_a(C_5H_{5-a-b}R^1{}_b)(C_5H_{5-a-c}R^2{}_c)M^1X^1Y^1 \quad (I\text{-}1)$$

$$Q^2{}_a(C_5H_{5-a-d}R^3{}_d)Z^1M^1X^1Y^1 \quad (I\text{-}2)$$

$$(C_5H_{5-e}R^4{}_e)M^1X^1Y^1W^1 \quad (I\text{-}3)$$

$$L^1L^2M^2X^1Y^1 \quad (I\text{-}4)$$

where $Q^1$ represents a bonding group that crosslinks the two conjugated five-membered cyclic ligands $(C_5H_{5-a-b}R^1{}_b)$ and $(C_5H_{5-a-c}R^2{}_c)$;

$Q^2$ represents a bonding group that crosslinks the conjugated five-membered cyclic ligand $(C_5H_{5-a-d}R^3{}_d)$ and the group $Z^1$;

$R^1$, $R^2$, $R^3$ and $R^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure;

a represents 0, 1 or 2;

b, c and d each represent an integer of from 0 to 5 when a=0, or an integer of from 0 to 4 when a=1, or an integer of from 0 to 3 when a=2;

e represents an integer of from 0 to 5;

$M^1$ represents a transition metal of Groups 4 to 6 of the Periodic Table;

$M^2$ represents a transition metal of Groups 8 to 10 of the Periodic Table;

$L^1$ and $L^2$ each represent a coordination-bonding ligand;

$X^1$, $Y^1$, $Z^1$ and $W^1$ each represent a covalent-bonding or ionic-bonding ligand; and $L^1$, $L^2$, $X^1$, $Y^1$ and $W^1$ may be bonded to each other to form a cyclic structure.

7. The catalyst for olefin polymer production as claimed in any one of claim 1, wherein the component (E), an alkylating agent is an organic aluminium compound.

8. A method for producing a catalyst for olefin polymer production, which comprises contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table.

9. A method for producing a catalyst for olefin polymer production, which comprises contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table and (E) an alkylating agent.

10. The method for producing a catalyst for olefin polymerization as claimed in claim 8, wherein the step of contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table is effected in an anhydrous aprotic solvent.

11. The method for producing a catalyst for olefin polymerization as claimed in claim 9, wherein the step of contacting (A) clay, a clay mineral or an ion-exchanging layered compound, (B) an organic silane compound and (C) at least 1% by weight, relative to the dry weight of the component (A), of water with each other, followed by further contacting the resulting product with (D) a transition metal complex containing a transition metal of Groups 4 to 6 or Groups 8 to 10 of the Periodic Table and (E) an alkylating agent is effected in an anhydrous aprotic solvent.

12. A method for producing olefin polymers, comprising:
polymerizing an olefin in the presence of the catalyst of claim 1.

13. A method of producing a catalyst for olefin polymerization from a transition metal compound and a silane compound-processed clay, which comprises:
contacting a transition metal compound with a silane compound-processed clay as prepared by contacting a clay dispersion of water-swellable clay in water with a silane compound, the water-swellable clay being selected from the group consisting of phyllosilicates, clays of the smectite family, clays of the mica family, alkali metal salts of montmorillonite, alkaline earth metal salts of montmorillonite, fluoro-tetrasilicon mica, laponite and smectone.

14. The method of producing a catalyst for olefin polymerization as claimed in claim 13, wherein a clay dispersion as prepared by dispersing water-swellable clay in water of at least 40 times by weight the clay is contacted with a silane compound.

15. The method of producing a catalyst for olefin polymerization as claimed in claim 13, wherein the silane compound is represented by a general formula (II-1)

(II-1)

where R represents a substituent of which the atom in the site directly bonding to the silicon atom is a carbon, silicon or hydrogen atom; X represents a substituent of which the atom in the site directly bonding to the silicon atom is a halogen, oxygen or nitrogen atom; plural R's and X's, if any, may be the same or different ones, respectively; and n represents 0 or an integer of from 1 to 4.

16. The method of producing a catalyst for olefin polymerization as claimed in claim 13, wherein the silane compound is represented by a general formula (II-2)

$(R)_m\text{—Si—}X_{(4-m)}$ (II-2)

where R represents a substituent of which the atom in the site directly bonding to the silicon atom is a carbon, silicon or hydrogen atom; X represents a substituent of which the atom in the site directly bonding to the silicon atom is a halogen, oxygen or nitrogen atom; plural R's and X's, if any, may be the same or different ones, respectively; and m represents an integer of from 1 to 3.

17. The method of producing a catalyst for olefin polymerization as claimed in claim 13, wherein the transition metal compound is a complex of a transition metal of Groups 4 to 6 of the Periodic Table having a conjugated five-membered ring as the ligand, or a complex of a transition metal of Groups 8 to 10 of the Periodic Table having an organic ligand as bonded to the transition metal via a nitrogen or phosphorus atom therebetween.

18. The method of producing a catalyst for olefin polymerization as claimed in claim 13, wherein the components are further contacted with an organic metal compound with a metal of Groups 1, 2, 13 and 14 of the Periodic Table.

19. A catalyst for olefin polymerization, which is produced according to the method of claim 13.

20. A method for producing olefin polymers, wherein olefins are polymerized in the presence of the catalyst for olefin polymerization of claim 19.

21. A catalyst for olefin polymerization, which comprises a transition metal compound and a silane compound-processed clay that gives absorption peaks in a range falling between 1090 and 1050 cm$^{-1}$ and/or in a range falling between 1015 and 995 cm$^{-1}$ in infrared absorption spectrometry.

22. The catalyst for olefin polymerization as claimed in claim 21, wherein the silane compound-processed clay is prepared by processing a phyllosilicate with a silane compound.

23. The catalyst for olefin polymerization as claimed in claim 21, wherein the silane compound-processed clay is prepared by processing a mineral of the smectite family or a compound having a smectite structure with a silane compound.

24. The catalyst for olefin polymerization as claimed in claim 21 wherein the silane compound-processed clay is prepared by processing montmorillonite with a silane compound.

25. The catalyst for olefin polymerization as claimed in claim 21 wherein the transition metal compound is a complex of a transition metal of Groups 4 to 6 of the Periodic Table having a conjugated five-membered ring as the ligand, or a complex of a transition metal of Groups 8 to 10 of the Periodic Table having an organic ligand as bonded to the transition metal via a nitrogen or phosphorus atom therebetween.

26. The catalyst for olefin polymerization as claimed in claim 21, which further contains an organic metal compound with a metal of Groups 1, 2, 13 and 14 of the Periodic Table.

27. A method for producing a catalyst for olefin polymerization, which comprises contacting a silane compound-processed clay with a transition metal compound and in which said silane compound-processed clay is prepared by contacting a silane compound of a general formula (III-1):

 (III-1)

where R represents a substituent of which the atom in the site directly bonding to the silicon atom is a carbon, silicon or hydrogen atom; X represents a substituent of which the atom in the site directly bonding to the silicon atom is a halogen, oxygen or nitrogen atom; plural R's and X's, if any, may be the same or different ones, respectively; and n represents an integer of 2 or 3, with clay, and gives absorption peaks in a range between falling 1090 and 1050 cm$^{-1}$ and/or in a range falling between 1015 and 995 cm$^{-1}$ in infrared absorption spectrometry.

28. A method for producing olefin polymers, wherein olefins are polymerized in the presence of the catalyst for olefin polymerization of claim 21 comprising:
   polymerizing an olefin in the presence of the catalyst of claim 21.

29. A method for producing olefin polymers, wherein olefins are polymerized in the presence of the catalyst for olefin polymerization as obtained according to the method of claim 27.

* * * * *